(12) United States Patent
Nelson et al.

(10) Patent No.: US 10,528,881 B2
(45) Date of Patent: Jan. 7, 2020

(54) METHODS AND APPARATUS FOR DETERMINING WHETHER A MEDIA PRESENTATION DEVICE IS IN AN ON STATE OR AN OFF STATE

(71) Applicant: THE NIELSEN COMPANY (US), LLC, New York, NY (US)

(72) Inventors: Daniel J. Nelson, Tampa, FL (US); Brian Scott Mello, Oldsmar, FL (US); Luc Zio, New Port Richey, FL (US); David James Croy, Palm Harbor, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 942 days.

(21) Appl. No.: 15/082,380

(22) Filed: Mar. 28, 2016

(65) Prior Publication Data

US 2016/0210557 A1 Jul. 21, 2016

Related U.S. Application Data

(63) Continuation of application No. 13/444,571, filed on Apr. 11, 2012, now Pat. No. 9,312,973, which is a
(Continued)

(51) Int. Cl.
*G06F 15/18* (2006.01)
*G06N 5/04* (2006.01)
(Continued)

(52) U.S. Cl.
CPC ............. *G06N 5/048* (2013.01); *G06F 7/023* (2013.01); *H04H 60/32* (2013.01); *H04H 60/58* (2013.01); *H04H 2201/90* (2013.01)

(58) Field of Classification Search
CPC .............................. G06F 16/2468; G06F 5/048
(Continued)

(56) References Cited

U.S. PATENT DOCUMENTS 3,281,695 A 10/1966 Bass
3,315,160 A 4/1967 Goodman
(Continued)

FOREIGN PATENT DOCUMENTS

CN 1244982 2/2000
DE 3401762 8/1985
(Continued)

OTHER PUBLICATIONS

"Bayesian Networks," Machine Learning A, 708.064 07 1sst KU Oregon State University, Oregon [Retrieved from the Internet on Feb. 29, 2008]. Retrieved from the Internet: http://www.igi.tugraz.at.lehre/MLA/WS07/slides3.pdf (21 pages).
(Continued)

*Primary Examiner* — David R Vincent
(74) *Attorney, Agent, or Firm* — Hanley, Flight & Zimmerman, LLC

(57) ABSTRACT

Methods and apparatus for determining whether a media presentation device is in an on state or an off state are disclosed. A disclosed example method comprises determining contribution values from at least one of a signal measured from a sensing device or an output signal accessed from the presentation device, wherein the contribution values are indicative of a state of a presentation device. Summing, via a logic circuit, a first plurality of the contribution values corresponding to a first measurement cycle to generate a first intermediate fuzzy score for the first measurement cycle. Storing the first intermediate fuzzy score in a buffer including a plurality of intermediate fuzzy scores corresponding to respective measurement cycles. Combin-
(Continued)

ing, via the logic circuit, the intermediate fuzzy scores corresponding to a first time period to form a final fuzzy score. When the final fuzzy score satisfies a threshold, setting the state of the presentation device as on and enabling crediting of media presented by the presentation device.

20 Claims, 24 Drawing Sheets

Related U.S. Application Data continuation of application No. 12/242,337, filed on Sep. 30, 2008, now Pat. No. 8,180,712.

(51) Int. Cl.
*H04H 60/32* (2008.01)
*G06F 7/02* (2006.01)
*H04H 60/58* (2008.01)

(58) Field of Classification Search
USPC .................................................. 706/15, 45
See application file for complete search history.

(56) References Cited

U.S. PATENT DOCUMENTS

| | | |
|---|---|---|
| 3,483,327 A | 12/1969 | Schwartz |
| 3,633,112 A | 1/1972 | Anderson |
| 3,651,471 A | 3/1972 | Haselwood et al. |
| 3,733,430 A | 5/1973 | Thompson et al. |
| 3,803,349 A | 4/1974 | Watanabe |
| 3,906,454 A | 9/1975 | Martin |
| 3,947,624 A | 3/1976 | Miyake |
| 4,027,332 A | 5/1977 | Wu et al. |
| 4,044,376 A | 8/1977 | Porter |
| 4,058,829 A | 11/1977 | Thompson |
| 4,245,245 A | 1/1981 | Matsumoto et al. |
| 4,388,644 A | 6/1983 | Ishman et al. |
| 4,546,382 A | 10/1985 | McKenna et al. |
| 4,566,030 A | 1/1986 | Nickerson et al. |
| 4,574,304 A | 3/1986 | Watanabe et al. |
| 4,613,904 A | 9/1986 | Lurie |
| 4,622,583 A | 11/1986 | Watanabe et al. |
| 4,642,685 A | 2/1987 | Roberts et al. |
| 4,644,393 A | 2/1987 | Smith et al. |
| 4,647,964 A | 3/1987 | Weinblatt |
| 4,697,209 A | 9/1987 | Kiewit et al. |
| 4,723,302 A | 2/1988 | Fulmer et al. |
| 4,764,808 A | 8/1988 | Solar |
| 4,769,697 A | 9/1988 | Gilley et al. |
| 4,779,198 A | 10/1988 | Lurie |
| 4,800,437 A | 1/1989 | Hosoya |
| 4,807,031 A | 2/1989 | Broughton et al. |
| 4,876,736 A | 10/1989 | Kiewit |
| 4,885,632 A | 12/1989 | Mabey et al. |
| 4,907,079 A | 3/1990 | Turner et al. |
| 4,912,552 A | 3/1990 | Allison, III et al. |
| 4,931,865 A | 6/1990 | Scarampi |
| 4,943,963 A | 7/1990 | Waechter et al. |
| 4,965,825 A | 10/1990 | Harvey et al. |
| 4,972,503 A | 11/1990 | Zurlinden |
| 5,097,328 A | 3/1992 | Boyette |
| 5,136,644 A | 8/1992 | Audebert et al. |
| 5,165,069 A | 11/1992 | Vitt et al. |
| 5,226,177 A | 7/1993 | Nickerson |
| 5,235,414 A | 8/1993 | Cohen |
| 5,251,324 A | 10/1993 | McMullan, Jr. |
| 5,310,222 A | 5/1994 | Chatwin et al. |
| 5,319,453 A | 6/1994 | Copriviza et al. |
| 5,319,456 A | 6/1994 | Copriviza et al. |
| 5,335,277 A | 8/1994 | Harvey et al. |
| 5,355,161 A | 10/1994 | Bird et al. |
| 5,398,055 A | 3/1995 | Nonomura et al. |
| 5,404,161 A | 4/1995 | Douglass et al. |
| 5,404,172 A | 4/1995 | Berman et al. |
| 5,408,258 A | 4/1995 | Kolessar |
| 5,425,100 A | 6/1995 | Thomas et al. |
| 5,425,109 A | 6/1995 | Saga et al. |
| 5,481,294 A | 1/1996 | Thomas et al. |
| 5,483,276 A | 1/1996 | Brooks et al. |
| 5,488,408 A | 1/1996 | Maduzia et al. |
| 5,505,901 A | 4/1996 | Harney et al. |
| 5,512,933 A | 4/1996 | Wheatley et al. |
| 5,550,928 A | 8/1996 | Lu et al. |
| 5,659,367 A | 8/1997 | Yuen |
| 5,760,760 A | 6/1998 | Helms |
| 5,767,922 A | 6/1998 | Zabih et al. |
| 5,771,307 A | 6/1998 | Lu et al. |
| 5,801,747 A | 9/1998 | Bedard |
| 5,874,724 A | 2/1999 | Cato |
| 5,889,548 A | 3/1999 | Chan |
| 5,896,554 A | 4/1999 | Itoh |
| 5,963,844 A | 10/1999 | Dail |
| 6,035,177 A | 3/2000 | Moses et al. |
| 6,049,286 A | 4/2000 | Forr |
| 6,124,877 A | 9/2000 | Schmidt |
| 6,137,539 A | 10/2000 | Lownes et al. |
| 6,154,548 A | 11/2000 | Bizzan |
| 6,175,634 B1 | 1/2001 | Graumann |
| 6,177,931 B1 | 1/2001 | Alexander et al. |
| 6,184,918 B1 | 2/2001 | Goldschmidt Iki et al. |
| 6,286,140 B1 | 9/2001 | Ivanyi |
| 6,297,859 B1 | 10/2001 | George |
| 6,311,214 B1 | 10/2001 | Rhoads |
| 6,388,662 B2 | 5/2002 | Narui et al. |
| 6,400,996 B1 | 6/2002 | Hoffberg et al. |
| 6,457,010 B1 | 9/2002 | Eldering et al. |
| 6,463,413 B1 | 10/2002 | Applebaum et al. |
| 6,467,089 B1 | 10/2002 | Aust et al. |
| 6,477,508 B1 | 11/2002 | Lazar et al. |
| 6,487,719 B1 | 11/2002 | Itoh et al. |
| 6,519,769 B1 | 2/2003 | Hopple et al. |
| 6,523,175 B1 | 2/2003 | Chan |
| 6,529,212 B2 | 3/2003 | Miller et al. |
| 6,542,878 B1 | 4/2003 | Heckerman et al. |
| 6,567,978 B1 | 5/2003 | Jarrel |
| 6,570,559 B1 | 5/2003 | Oshima |
| 6,647,212 B1 | 11/2003 | Toriumi et al. |
| 6,647,548 B1 | 11/2003 | Lu et al. |
| 6,675,383 B1 | 1/2004 | Wheeler et al. |
| 6,681,396 B1 | 1/2004 | Bates et al. |
| 6,791,472 B1 | 9/2004 | Hoffberg |
| 6,934,508 B2 | 8/2005 | Ceresoli et al. |
| 6,946,803 B2 | 9/2005 | Moore |
| 7,051,352 B1 | 5/2006 | Schaffer |
| 7,100,181 B2 | 8/2006 | Srinivasan et al. |
| 7,150,030 B1 | 12/2006 | Eldering et al. |
| 7,647,604 B2 | 1/2010 | Ramaswamy |
| 7,712,114 B2 | 5/2010 | Ramaswamy |
| 7,786,987 B2 | 8/2010 | Nielsen |
| 7,882,514 B2 | 2/2011 | Nielsen et al. |
| 8,108,888 B2 | 1/2012 | Ramaswamy |
| 8,180,712 B2 | 5/2012 | Nelson et al. |
| 8,311,973 B1 | 11/2012 | Zadeh |
| 8,526,626 B2 | 9/2013 | Nielsen et al. |
| 8,683,504 B2 | 3/2014 | Ramaswamy |
| 9,015,743 B2 | 4/2015 | Ramaswamy |
| 9,027,043 B2 | 5/2015 | Johnson |
| 9,473,795 B2 | 10/2016 | Stokes et al. |
| 2002/0012353 A1 | 1/2002 | Gerszberg et al. |
| 2002/0015112 A1 | 2/2002 | Nagakubo et al. |
| 2002/0026635 A1 | 2/2002 | Wheeler et al. |
| 2002/0056087 A1 | 5/2002 | Berezowski et al. |
| 2002/0057893 A1 | 5/2002 | Wood et al. |
| 2002/0059577 A1 | 5/2002 | Lu et al. |
| 2002/0072952 A1 | 6/2002 | Hamzy et al. |
| 2002/0077880 A1 | 6/2002 | Gordon et al. |
| 2002/0080286 A1 | 6/2002 | Daglas et al. |
| 2002/0083435 A1 | 6/2002 | Blasko |
| 2002/0141730 A1 | 10/2002 | Haken |
| 2002/0174425 A1 | 11/2002 | Markel et al. |
| 2002/0198762 A1 | 12/2002 | Donato |
| 2003/0046685 A1 | 3/2003 | Srinivasan et al. |

(56) References Cited

U.S. PATENT DOCUMENTS

| | | | |
|---|---|---|---|
| 2003/0054757 A1 | 3/2003 | Kolessar et al. |
| 2003/0056215 A1 | 3/2003 | Kanungo |
| 2003/0067459 A1 | 4/2003 | Lim |
| 2003/0093790 A1 | 5/2003 | Logan et al. |
| 2003/0101449 A1 | 5/2003 | Bentolila et al. |
| 2003/0110485 A1 | 6/2003 | Lu et al. |
| 2003/0115591 A1 | 6/2003 | Weissmueller, Jr. et al. |
| 2003/0131350 A1 | 7/2003 | Peiffer et al. |
| 2003/0216120 A1 | 11/2003 | Ceresoli et al. |
| 2004/0003394 A1 | 1/2004 | Ramaswamy |
| 2004/0055020 A1 | 3/2004 | Delpuch |
| 2004/0058675 A1 | 3/2004 | Lu et al. |
| 2004/0073918 A1 | 4/2004 | Ferman et al. |
| 2004/0088212 A1 | 5/2004 | Hill |
| 2004/0088721 A1 | 5/2004 | Wheeler et al. |
| 2004/0100437 A1 | 5/2004 | Hunter et al. |
| 2004/0181799 A1 | 9/2004 | Lu et al. |
| 2004/0210922 A1 | 10/2004 | Peiffer et al. |
| 2004/0233126 A1 | 11/2004 | Moore |
| 2005/0054285 A1 | 3/2005 | Mears et al. |
| 2005/0057550 A1 | 3/2005 | George |
| 2005/0125820 A1 | 6/2005 | Nelson et al. |
| 2005/0221774 A1 | 10/2005 | Ceresoli et al. |
| 2005/0286860 A1 | 12/2005 | Conklin |
| 2006/0075421 A1 | 4/2006 | Roberts et al. |
| 2006/0093998 A1 | 5/2006 | Vertegaal |
| 2006/0195857 A1 | 8/2006 | Wheeler et al. |
| 2006/0212895 A1 | 9/2006 | Johnson |
| 2006/0232575 A1 | 10/2006 | Nielsen |
| 2007/0063850 A1 | 3/2007 | Devaul et al. |
| 2007/0186228 A1 | 8/2007 | Ramaswamy et al. |
| 2007/0192782 A1 | 8/2007 | Ramaswamy |
| 2007/0210943 A1* | 9/2007 | Tropf ................ H03M 13/47 341/51 |
| 2007/0250214 A1* | 10/2007 | Lee .................. B01J 19/0006 700/266 |
| 2008/0028427 A1 | 1/2008 | Nesvadba et al. |
| 2008/0148307 A1 | 6/2008 | Nielsen et al. |
| 2008/0276265 A1 | 11/2008 | Topchy et al. |
| 2010/0083299 A1 | 4/2010 | Nelson et al. |
| 2010/0172407 A1 | 7/2010 | Ramaswamy |
| 2012/0102515 A1 | 4/2012 | Ramaswamy |
| 2012/0203731 A1 | 8/2012 | Nelson et al. |
| 2014/0007153 A1 | 1/2014 | Nielsen et al. |
| 2015/0222951 A1 | 8/2015 | Ramaswamy |
| 2016/0173921 A1 | 6/2016 | Stokes et al. |

FOREIGN PATENT DOCUMENTS

| | | |
|---|---|---|
| EP | 0283570 A2 | 9/1988 |
| EP | 0593202 | 4/1994 |
| EP | 0946012 | 9/1999 |
| EP | 1318679 | 6/2003 |
| GB | 1574964 | 9/1980 |
| JP | 8331482 | 12/1996 |
| JP | 2000307520 | 11/2000 |
| WO | WO9115062 | 10/1991 |
| WO | WO9512278 | 5/1995 |
| WO | WO9526106 | 9/1995 |
| WO | WO9810539 | 3/1998 |
| WO | WO9832251 | 7/1998 |
| WO | WO9933206 | 7/1999 |
| WO | WO9959275 | 11/1999 |
| WO | WO0038360 | 6/2000 |
| WO | WO0072484 | 11/2000 |
| WO | WO0111506 | 2/2001 |
| WO | WO0145103 | 6/2001 |
| WO | WO0161892 | 8/2001 |
| WO | WO0219581 | 3/2002 |
| WO | WO02052759 | 7/2002 |
| WO | WO03049339 | 6/2003 |
| WO | WO03052552 | 6/2003 |
| WO | WO03060630 | 7/2003 |
| WO | WO05032145 | 4/2005 |
| WO | WO05038625 | 4/2005 |
| WO | WO05041166 | 5/2005 |
| WO | WO2005055601 | 6/2005 |
| WO | WO05065159 | 7/2005 |
| WO | WO05079457 | 9/2005 |
| WO | WO06012629 | 2/2006 |
| WO | WO07120518 | 10/2007 |

OTHER PUBLICATIONS

"Learning Bayesian Networks: Naive and non-Naive Bayes" Oregon State University, Oregon [Retrieved from the Internet on Feb. 29, 2008]. Retrieved from the Internet: http://web.engr.oregonstate.edu/~tgd/classess/534/slides/part6.pdf (18 pages).

"Lecture 3; Naive Bayes Classification," http://www.cs.utoronto.ca/~strider/CSCD11_f08/NaiveBayesZemel.pdf [Retrieved from the Internet on Feb. 29, 2008] (9 pages).

"Logical Connective: Philosophy 103: Introduction to Logic Conjunction, Negation, and Disjunction," [Retrieved from the Internet on 200-03-11] Retrieved from the Internet: http://philosophy.lander.edu/logic/conjunct.html (5 pages).

"Naive Bayes Classifier," Wikipedia entry as of Jan. 11, 2008 [Retrieved from the Internet from Wikipedia history pages on Mar. 11, 2009] (7 pages).

"Naive Bayes Classifier," Wikipedia entry as of Mar. 11, 2009 [Retrieved from the Internet on Mar. 11, 2009] (7 pages).

"The Naive Bayes Classifier," CS534-Machine Learning, Oregon State University, Oregon [Retrieved from the Internet on Feb. 29, 2008]. Retrieved from the Internet: http://web.engr.oregonstate.edu/~afern/classes/cs534/notes/Naivebayes-10.pdf (19 pages).

"Synaptic," The Peltarion Blog, Jul. 10, 2006 [Retrieved from the Internet on Mar. 11, 2009] Retrieved from the Internet: http//blog.peltarion.com/2006/07/10/classifier-showdown (14 pages).

Zimmerman, H., "Fuzzy set applications in pattern recognition and data-analysis," 11th IAPR International conference on Pattern Recognition, Aug. 29, 1992 (81 pages).

Canadian Intellectual Property Office, "Office Action," issued in connection with Application No. 2,619,781, dated Sep. 12, 2013, 3 pages.

Canadian Intellectual Property Office, "Office Action," issued in connection with Application No. 2,619,781, dated Jan. 26, 2015, 4 pages.

CIPO, "Notice of Allowance", issued in connection with Canadian Patent Application No. 2,576,865, dated Oct. 2, 2012 (1 page).

CIPO, "Office Action," issued in connection with Canadian Patent Application No. 2,576,865, dated Jun. 17, 2011 (3 pages).

CIPO, "Office Action," issued in connection with Canadian Patent Application No. 2,576,865, dated Mar. 29, 2010 (5 pages).

Dai et al., "Transferring Naive Bayes Classifiers for Text Classification," Proceedings of the Twenty-Second AAAI Conference on Artificial Intelligence, held in Vancouver, British Columbia on Jul. 22-26, 2007 (6 pages).

Domingos et al., "On the Optimality of the Simple Bayesian Classifier under Zero-One Loss," Machine Learning, vol. 29, No. 2, pp. 103-130, Nov. 1, 1997 (28 pages).

Elkan, Charles, "Naive Bayesian Learning," Adapted from Technical Report No. CS97-557, Department of Computer Science and Engineering, University of California, San Diego, U.S.A., Sep. 1997 (4 pages).

EPO, "Extended European Search Report ," issued in connection with European Patent Application No. 11009958.7, dated Jul. 18, 2012 (10 pages).

EPO, "Communication Pursuant to Article 94(3) EPC," issued in connection with European Patent Application No. 05798239.9, dated Dec. 27, 2010 (4 pages).

EPO, "Communication Pursuant to Article 94(3) EPC," issued in connection with European Patent Application No. 05798239.9, dated Dec. 8, 2009 (5 pages).

EPO, "Communication Pursuant to Article 94(3) EPC," issued in connection with European Patent Application No. 11009958.7, dated Mar. 20, 2013 (4 pages).

(56) References Cited

OTHER PUBLICATIONS

EPO, "Communication Pursuant to Rule 62a( 1) EPC and Rule 63(1) EPC," issued in connection with European Patent Application No. 1100958.7, dated Mar. 27, 2012 (3 pages).
EPO, "Examination Report," issued in connection with European Patent Application No. 06801611.2, dated Jun. 25, 2013 (4 pages).
EPO, "Extended European Search Report," issued in connection with European Patent Application No. 06801611.2, dated Mar. 2, 2012 (5 pages).
EPO, "Summons to Attend Oral Proceedings Pursuant to Rule 115(1) EPC," issued in connection with European Patent Application No. 05798239.9, mailed Dec. 22, 2011 (3 pages).
European Patent Office, "Examination Report", issued in connection with European Patent Application No. 11009958.7, dated Jul. 9, 2014 (5 pages).
European Patent Office, "Extended European Search Report," issued in connection with European Patent Application No. EP05798239.9, dated Sep. 9, 2008 (4 pages).
European Patent Office, "Summons to attend oral proceedings pursuant to Rule 115(1) EPC", issued in connection with European Patent Application No. 11009958.7, dated Apr. 30, 2015 (1 page).
Intellectual Property Office of New Zealand, "Examination Report," issued in connection with New Zealand Patent Application No. 553385 dated Nov. 18, 2009 (2 pages).
Intellectual Property Office of New Zealand, "Examination Report," issued in connection with New Zealand Patent Application No. 553385, dated Oct. 17, 2008 (2 pages).
Austrian Patent Office, "Written Opinion," issued in connection with Singapore Patent Application No. 200700990-5, dated Jun. 23, 2009 (4 pages).
International Preliminary Examining Authority, "Written Opinion" for PCT Application Application Serial No. PCT/US2003/030355 dated Mar. 21, 2008 (5 pages).
International Preliminary Report on Patentability corresponding to International Application Serial No. PCT/US2003/30370, dated Mar. 7, 2005, 4 pages.
International Search Report corresponding to International Application Serial No. PCT/US2003/030355, dated May 5, 2004, 6 pages.
International Search Report corresponding to International Patent Application Serial No. PCT/US2003/30370, dated Mar. 11, 2004, 7 pages.
IP Australia, "Examiner's First Report," issued in connection with Australian Patent Application No. 2005273948, dated May 22, 2009 (2 pages).
IP Australia, "Examiner's First Report," issued in connection with Australian Patent Application No. 2010201753, dated Mar. 23, 2011 (2 pages).
IP Australia, "Examiner's First Report," issued in connection with Australian Patent Application No. 2010219320, dated Jun. 20, 2012 (4 pages).
IP Australia, "Notice of Acceptance," issued in connection with Application No. 2013203468, dated Oct. 1, 2015, 2 pages.
IP Australia, "Notice of Allowance," issued in connection with Australian Patent Application No. 2010201753, dated Apr. 17, 2012 (3 pages).
IP Australia, "Notice of Grant," issued in connection with Application No. 2010219320, dated Dec. 5, 2013, 2 pages.
IP Australia, "Patent Examination Report No. 1," issued in connection with Application No. 2013203468, dated Aug. 26, 2014, 3 pages.
Johnson, Karin A. "Methods and Apparatus to Detect an Operating State of a Display," U.S. Appl. No. 11/388,262, filed Mar. 24, 2006.
KIPO, "Notice of Preliminary Rejection," issued in connection with Korean Patent Application No. 10-2007-7005373, dated May 30, 2012 (5 pages).
KIPO, "Notice of Preliminary Rejection," issued in connection with Korean Patent Application No. 10-2007-7005373, dated Oct. 31, 2011 (5 pages).
KIPO, "Notice of Allowance," issued in connection with Korean Patent Application No. 10-2007-7005373, dated Dec. 24, 2012 (3 pages).
Klein, "PowerPoint Presentation of Lecture 23: Naive Bayes, CS 188: Artificial Intelligence," held on Nov. 15, 2007 (6 pages).
Lang, Marcus, "Implementation on Naive Bayesian Classifiers in Java," http://www.iit.edu/~ipro356fD3/ipro/documents/naive-bayes.edu [Retrieved from the Internet on Feb. 29, 2008] (4 pages).
Liang et al., "Learning Naive Bayes Tree for Conditional Probability Estimation," Proceedings of the Canadian Al-2006 Conference, held in Quebec, Canada, pp. 456-466, on Jun. 7-9, 2006 (13 pages).
Lu et al., "Content Analysis for Audio Classification and Segmentation," IEEE Transactions on Speech and Audio Processing, vol. 10, No. 7, Oct. 2002 (14 pages).
Mexican Patent Office, "Notice of Allowance," issued in connection with Mexican Patent Application No. MX/a/2008/002317, dated Jan. 11, 2011, 1 page.
Mexican Patent Office, "Official Action (with English Language Translation)," issued in connection with Mexican Patent Application No. MX/a/2007/001734, dated Jul. 24, 2009 (6 pages).
Mitchell, Tom M., "Chapter 1; Generative and Discriminative Classifiers: Naive Bayes and Logistic Regression," Machine Learning, Sep. 21, 2006 (17 pages).
Mozina et al., "Nomograms for Visualization of Naive Bayesian Classifier," Proceedings of the Eighth European Conference on Principles and Practice of Knowledge Discovery in Databases, held in Pisa, Italy, pp. 337-348, 2004 [Retrieved from the Internet on Feb. 29, 2008] (12 pages).
Nielsen, Christen V., "Methods and Apparatus to Detect an Operating State of Display Based on Visible Light," U.S. Appl. No. 11/388,555, filed Mar. 24, 2006.
Patent Cooperation Treaty, "International Preliminary Report on Patentability," issued by the International Bureau in connection with PCT application No. PCT/US2005/028106, dated Mar. 27, 2007, (4 pages).
Patent Cooperation Treaty, "International Preliminary Report on Patentability," issued by the International Bureau in connection with PCT application No. PCT/US2006/031960, dated Feb. 20, 2008 (4 pages).
Patent Cooperation Treaty, "International Search Report," issued by the International Searching Authority in connection with PCT application No. PCT/US2005/028106, dated Mar. 12, 2007 (2 pages).
Patent Cooperation Treaty, "International Search Report," issued by the International Searching Authority in connection with PCT application No. PCT/US2006/031960, dated Feb. 21, 2007 (3 pages).
Patent Cooperation Treaty, "Written Opinion of the International Searching Authority," issued by the International Searching Authority in connection with PCT application No. PCT /US2006/031960, dated Feb. 21, 2007 (3 pages).
Patent Cooperation Treaty, "Written Opinion of the International Searching Authority," issued by the International Searching Authority in connection with PCT application No. PCT/US2005/028106, dated Mar. 12, 2007 (4 pages).
Patron-Perez et al., "A Probabilistic Framework for Recognizing Similar Actions using Spatio-Temporal Features," BMVC07, 2007 [Retrieved from the Internet on Feb. 29, 2008] (10 pages).
PCT, "International Preliminary Examination Report," issued in connection with PCT Application No. PCT/US2003/030355, dated Mar. 18, 2011 (5 pages).
SIPO, "First Notification of Office Action," issued in connection with Chinese Patent Application No. 20058003020.X, dated Jun. 5, 2009 (11 pages).
SIPO, "Rejection Decision," issued in connection with Chinese Patent Application No. 200580030202.X, dated Mar. 24, 2011 (9 pages).
Smith, Leslie S., "Using IIDs to Estimate Sound Source Direction," Proceedings of the Seventh International Conference on Simulation of Adaptive Behavior on from Animals to Animats, pp. 60-61, 2002 (2 pages).

(56) References Cited

OTHER PUBLICATIONS

State Intellectual Property Office of China, "Fourth Office Action", issued in connection with Chinese Patent Application No. 200580030202.X, dated Mar. 18, 2013 (6 pages).
State Intellectual Property Office of China, "Notice of Allowance", issued in connection with Chinese Patent Application No. 200580030202.X, dated Jun. 21, 2013 (5 pages).
State Intellectual Property Office of China, "Office Action," issued in connection with Chinese Application No. 201110288875.2, dated Oct. 30, 2013, and corresponding English translation (8 pages).
The State Intellectual Property Office of China (SIPO), "First Office Action" issued in connection with Chinese Patent Application Serial No. 200680036510.8, dated Jul. 10, 2009 (10 pages).
The State Intellectual Property Office of China (SIPO), "Notice of Allowance," issued in connection with Chinese Patent Application Serial No. 200680036510.8, dated Aug. 9, 2010 (5 pages).
The State Intellectual Property Office of China (SIPO), "Second Office Action" issued in connection with Chinese Patent Application Serial No. 200680036510.8, dated Mar. 24, 2010 (9 pages).
The State Intellectual Property Office of China, "Office Action", issued in connection with Chinese Patent Application No. 201110288875.2, dated Jul. 18, 2014 (12 pages).
Thomas, William L., "Television Audience Research Technology, Today's Systems and Tomorrow's Challenges," Nielsen Media Research, Jun. 5, 1992 (4 pages).
Tsekeridou et al., "Content-Based Video Parsing and Indexing Based on Audio-Visual Interaction," IEEE Transactions on Circuits and Systems for Video Technology, vol. 11 No. 4, Apr. 1, 2001, 14 pages.
Vincent et al., "A Tentative Typology of Audio Source Separation Tasks," 4th International Symposium on Independent Component Analysis and Blind Signal Separation (ICA 2003), held in Nara, Japan, Apr. 2003 (6 pages).
Written Opinion corresponding to International Application Serial No. PCT/US2003/30370, dated Nov. 15, 2004, 5 pages.
Zhang, Harry, "The Optimality of Naive Bayes," Proceedings of the Seventeenth International FLAIRS Conference, 2004 (6 pages).
United States Patent and Trademark Office, "Advisory Action," issued in connection with U.S. Appl. No. 11/388,262, dated Jan. 7, 2010, 4 pages.
United States Patent and Trademark Office, "Advisory Action," issued in connection with U.S. Appl. No. 11/388,555, dated Jan. 13, 2009, 6 pages.
United States Patent and Trademark Office, "Advisory Action," issued in connection with U.S. Appl. No. 11/388,555, dated Mar. 22, 2010, 4 pages.
United States Patent and Trademark Office, "Decision on Appeal," issued in connection with U.S. Appl. No. 11/388,262, Sep. 29, 2014, 7 pages.
United States Patent and Trademark Office, "Examiner's Answer," issued in connection with U.S. Appl. No. 11/388,262 dated Aug. 4, 2011.
United States Patent and Trademark Office, "Final Office Action," issued in connection with U.S. Appl. No. 11/388,262, dated Oct. 12, 2010, 22 pages.
United States Patent and Trademark Office, "Final Office Action," issued in connection with U.S. Appl. No. 11/388,262, dated Sep. 2, 2009, 25 pages.
United States Patent and Trademark Office, "Final Office Action," issued in connection with U.S. Appl. No. 11/388,555, dated Dec. 8, 2009, 16 pages.
United States Patent and Trademark Office, "Final Office Action," issued in connection with U.S. Appl. No. 11/388,555, dated Oct. 6, 2008, 21 pages.
United States Patent and Trademark Office, "Non-Final Office Action," issued in connection with U.S. Appl. No. 11/388,262, dated Apr. 28, 2010, 13 pages.
United States Patent and Trademark Office, "Non-Final Office Action," issued in connection with U.S. Appl. No. 11/388,555, dated Dec. 27, 2007, 16 pages.
United States Patent and Trademark Office, "Non-Final Office Action," issued in connection with U.S. Appl. No. 11/388,555, dated Mar. 31, 2009, 23 pages.
United States Patent and Trademark Office, "Non-Final Office Action," issued in connection with U.S. Appl. No. 12/831,870, dated Nov. 29, 2012, 23 pages.
United States Patent and Trademark Office, "Non-Final Office Action," issued in connection with U.S. Appl. No. 14/686,470, dated Jun. 19, 2015, 10 pages.
United States Patent and Trademark Office, "Non-Final Office Action," issued in connection with U.S. Appl. No. 13/444,571, dated Jul. 30, 2015, 28 pages.
United States Patent and Trademark Office, "Notice of Allowability," issued in connection with U.S. Appl. No. 12/831,870, dated Aug. 1, 2013, 6 pages.
United States Patent and Trademark Office, "Notice of Allowance", issued in connection with U.S. Appl. No. 14/188,245, dated Sep. 15, 2014 (9 pages).
United States Patent and Trademark Office, "Notice of Allowance", issued in connection with U.S. Appl. No. 14/188,245, dated Dec. 18, 2014 (5 pages).
United States Patent and Trademark Office, "Notice of Allowance," issued in connection with U.S. Appl. No. 11/388,262, dated Jan. 5, 2015, 17 pages.
United States Patent and Trademark Office, "Notice of Allowance," issued in connection with U.S. Appl. No. 11/388,555, dated May 20, 2010, 15 pages.
United States Patent and Trademark Office, "Notice of Allowance," issued in connection with U.S. Appl. No. 12/831,870, dated Apr. 24, 2013, 25 pages.
United States Patent and Trademark Office, "Notice of Allowance," issued in connection with U.S. Appl. No. 14/686,470, dated Oct. 15, 2015, 32 pages.
United States Patent and Trademark Office, "Notice of Allowance," issued in connection with U.S. Appl. No. 12/242,337, dated Jan. 12, 2012, 24 pages.
United States Patent and Trademark Office, "Notice of Allowance," issued in connection with U.S. Appl. No. 12/242,337, dated Sep. 12, 2011 (17 pages).
United States Patent and Trademark Office, "Notice of Allowance," issued in connection with U.S. Appl. No. 13/444,571, dated Dec. 2, 2015, 18 pages.
United States Patent and Trademark Office, "Notice of Allowance," issued in connection with U.S. Appl. No. 11/576,328, dated Apr. 7, 2010 (8 pages).
United States Patent and Trademark Office, "Notice of Allowance," issued in connection with U.S. Appl. No. 11/672,706, dated Dec. 31, 2009 (6 pages).
United States Patent and Trademark Office, "Notice of Allowance," issued in connection with U.S. Appl. No. 12/725,018, dated Sep. 28, 2011 (7 pages).
United States Patent and Trademark Office, "Notice of Allowance," issued in connection with U.S. Appl. No. 12/725,018, dated Jun. 27, 2011 (8 pages).
United States Patent and Trademark Office, "Notice of Allowance," issued in connection with U.S. Appl. No. 13/341,575, dated Oct. 28, 2013 (9 pages).
United States Patent and Trademark Office, "Office Action," issued in connection with U.S. Appl. No. 11/576,328, dated Aug. 7, 2009 (11 pages).
United States Patent and Trademark Office, "Office Action," issued in connection with U.S. Appl. No. 11/672,706, dated Jul. 23, 2009 (7 pages).
United States Patent and Trademark Office, "Office Action," issued in connection with U.S. Appl. No. 13/341,575, dated Jul. 10, 2013 (12 pages).
United States Patent and Trademark Office, "Non-Final Office Action," issued in connection with U.S. Appl. No. 11/576,328, dated Feb. 5, 2009, (20 pages).

(56) References Cited

OTHER PUBLICATIONS

United States Patent and Trademark Office, "Non-Final Office Action," issued in connection with U.S. Appl. No. 11/388,262, dated Mar. 5, 2009, (22 pages).

* cited by examiner

METHODS AND APPARATUS FOR DETERMINING WHETHER A MEDIA PRESENTATION DEVICE IS IN AN ON STATE OR AN OFF STATE

RELATED APPLICATION

This patent arises from a continuation of U.S. patent application Ser. No. 13/444,571, filed on Apr. 11, 2012, now U.S. Pat. No. 9,312,973, which is a continuation of U.S. patent application Ser. No. 12/242,337, filed on Sep. 30, 2008, now U.S. Pat. No. 8,180,712. U.S. patent application Ser. No. 13/444,571 and U.S. patent application Ser. No. 12/242,337 are hereby incorporated herein by reference in their entirety.

FIELD OF THE DISCLOSURE

The present disclosure relates generally to audience measurement, and more particularly, to methods and apparatus for determining whether a media presentation device is in an on state or an off state.

BACKGROUND

Media ratings and other audience metering information are typically generated by collecting media exposure information from a group of statistically selected households. Each of the statistically selected households typically has a data logging and processing unit commonly referred to as a "home unit," "meter" or "audience measurement device." In metered households or, more generally, metering sites having multiple media presentation devices, the data logging and processing functionality may be distributed among a single home unit and multiple site units, where one site unit may be provided for each media presentation device or media presentation area. The home unit (or the combination of the home unit and the site units) includes sensors to gather data from the monitored media presentation devices (e.g., audio-video (AV) devices) at the selected site.

Modern media presentation devices are becoming more complex in functionality and interoperability with other media presentation devices. As a result, manufacturers are exploring new, user-friendly ways of standardizing interfaces to simplify the set-up and operation of these devices. For example, High-Definition Multimedia Interface-Consumer Electronic Control (HDMI-CEC) simplifies the setup and operation of an otherwise complex arrangement of networked media presentation devices. Although the networked media devices may communicate via such a standardized interface, some or all of the media presentation devices may remain independently powered and, as such, may be turned on and off independently.

DETAILED DESCRIPTION

Figure 1:
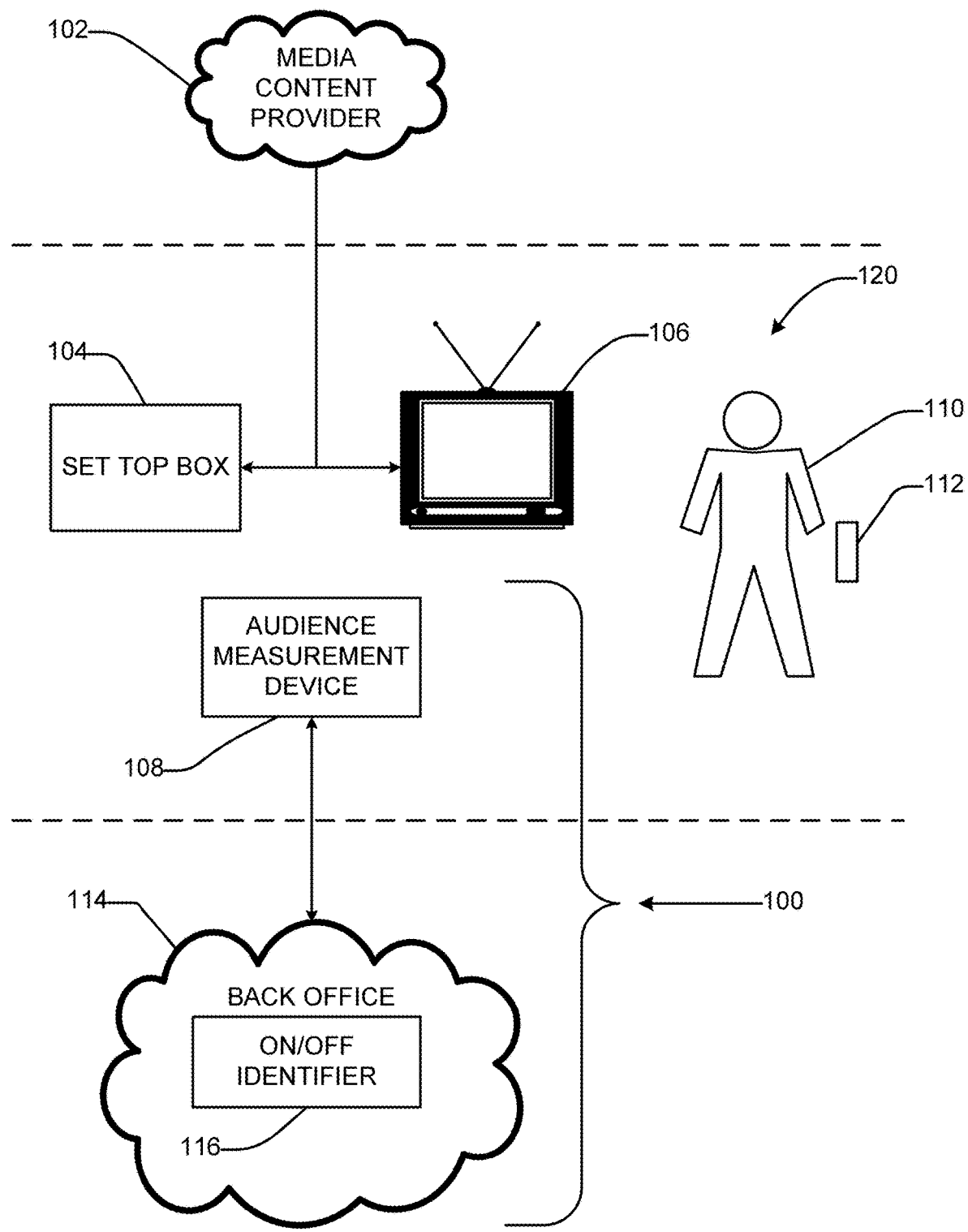
FIG. 1 is a block diagram of an example media monitoring system to detect an on state or an off state of a media presentation device.

Certain examples are shown in the above-identified figures and described in detail below. In describing these examples, like or identical reference numbers are used to identify common or similar elements. Although the example systems and apparatus described herein include, among other components, software executed on hardware, such systems and apparatus is merely illustrative and should not be considered as limiting. Any or all of the disclosed components could be embodied exclusively in hardware, exclusively in software, exclusively in firmware or in some combination of hardware, firmware or software.

In the example descriptions that follow, reference is made to certain example constant values used as, for example, thresholds, adjustment factors, etc. Such example constant values correspond to the example experimental results illustrated in FIGS. 16-20 and discussed in greater detail below. However, these constant values are merely illustrative examples and are not meant to be limiting. For example, any or all of the described example constant values may be changed depending on the particular operating environment in which the example methods and/or apparatus described herein are employed.

Metering data providing an accurate representation of the exposure to media content of persons in metered households is useful in generating media ratings of value to advertisers and/or producers of media content. Generating accurate metering data has become difficult as the media presentation devices have become more complex in functionality and interoperability. Manufacturers are developing standardized interfaces to ease the set-up and connection of these devices (e.g., such as HDMI-CEC). However, the media presentation devices may still be powered independently. For example, a media source device (e.g., a set top box) may be in an on state and providing media content to a media presentation device (e.g., a television) that is in an off state. As a result, whereas metering data reflecting the operation of the STB of this example would indicate exposure to media content, in reality the example television is "off" and, therefore, no exposure is possible. Metering data accurately representing the on states and off states of each media presentation device (e.g., each of the television and the set top box described above) help ensure that the media ratings accurately represent the media exposure habits of persons in metered environments.

Many existing methods for determining an on state or an off state of a television utilize data from sensors associated with an audience measurement device located within the metered environment. For example, the sensors may detect audio signals associated with the operation of televisions (e.g., 15.75 kHz signals from the power unit (e.g., the flyback converter) of a CRT display), video signals (e.g. light levels), electromagnetic fields associated with a media presentation device and/or remote control signals (e.g., radio frequency or infrared signals). Audience measurement devices utilizing these methods require additional components designed to detect the on state or the off state of the media devices (e.g., light level detectors, electromagnetic field detectors, etc.), additional processor capacity to process the additional data (e.g., detecting and filtering a 15.75 kHz signal from an audio signal) and/or additional memory to store a greater amount of data. Such metering devices may be large, contain multiple sensing units, and/or be expensive to build, resulting from the need for additional sensors, processing power and memory.

The previously known technologies to detect the on state or the off state of a media presentation device, as discussed above, are complex to set up by a person without additional training (e.g., in locating the additional sensors properly to obtain a signal) and/or are expensive to build and/or transport (e.g., because additional components add cost and weight), which may reduce the number of participants capable of being included in a metering project. Further, newer television technologies (e.g., liquid crystal display (LCD) televisions, plasma televisions and projection televisions) do not create the 15.75 kHz emissions associated with a flyback converter in cathode ray tube (CRT) televisions and, thus, are not conducive to on/off metering by flyback converter noise detection.

Against this backdrop, portable audience measurement devices configured to capture data regarding media exposure (e.g., television viewing habits of person(s) in metered households) without the use of additional components (e.g., sensors, additional memory, etc) dedicated to sense the on state or off state of media presentation devices are disclosed herein. More specifically, the example methods and apparatus described herein may be used to identify the on state or the off state of media presentation devices (e.g., televisions, stereo receivers, etc.) from existing data collected by an audience measurement device over a time period of interest. Portable metering devices (e.g., mailable meters which are the audience measurement devices designed to be sent to metering sites (e.g., households where at least one person elects to participate in an audience measurement panel)), installed by the participating person(s) at the metered site(s) and then returned to a back office for processing after a period of time, may particularly benefit from these techniques. However, other types of meters may also benefit from the described techniques. In the case of a portable meter, the meter and/or the data collected by the meter are sent to a back office where the collected data is processed to identify the media content detected in the metered household and to determine if such detected media content should be credited as having been presented to one or more audience members.

One method of crediting media content as being presented to one or more audience members is accomplished through examining signatures of captured signals (e.g., a captured audio signal and/or a captured video signal). For example, a signature may be determined from an audio signal captured via a microphone of a meter regardless of whether a media presentation device was actively presenting media content. For example, any audio signal, such as the audio content of a television program or a conversation in a room containing the meter, may be processed to determine a signature. The signature may be used for crediting media content as having been presented in a metered environment if a match is found between the determined signature and an entry in a reference database. Crediting information corresponding to such signature matches may be used to determine whether a media presentation device is in the on state or the off state, but signature matches alone does not provide accurate results. For example, a television may be on and presenting media content without a signature match being found with the reference database, such as when the media content is being provided by a digital versatile disc (DVD). However, an unmatched signature (e.g., corresponding to people talking in the room) may also be collected when the television is in the off state. Furthermore, although valid crediting information provides a strong inference that a media presentation device is in the on state or the off state, other factors (e.g., signature characteristics, remote control hints and/or a gain of a microphone in a meter) utilized by the example methods and apparatus described herein can improve the accuracy of the on/off determination.

To this end, the example methods and apparatus described herein obtain a signature, a gain associated with a microphone and/or hints associated with remote control events associated with the media presentation device as detected by an audience measurement device. A characteristic associated with the signature is determined and analyzed to identify the on state or the off state of the monitored media presentation device. In the illustrated example, the is determined by (1) deriving a magnitude associated with the signature and integrating the derived magnitude over a period of time and/or (2) determining a standard deviation of a magnitude associated with the signature over a period of time.

The example methods and apparatus described herein may identify whether the monitored media presentation device is in the on state or the off state based on the determined characteristic of the signature and/or a gain in a microphone of the audience measurement device that detected the media content. Alternatively or additionally, the example methods and apparatus may identify whether the media presentation device is in the on or the off state based on a hint from a remote control device monitored by the audience measurement device that detected the media content or by a second audience measurement device.

In an example implementation, the gain in the microphone of the audience measurement device, the hints derived from events reflecting the operation of a remote control device and/or the characteristic(s) of the signature magnitude are analyzed with a fuzzy logic engine within an on/off identifier. The fuzzy logic engine stores a record representing the on state or the off state of the media presentation device over the metered period in an output database.

Referring to FIG. 1, a media content provider 102 provides content to an audience via one or more information presentation devices, such as a set top box 104 and a television 106. The components of the media presentation system may be coupled in any manner. In the illustrated example, the television 106 is positioned in a monitored area 120 located within a household occupied by one or more people, represented by a person 110, some or all of whom have agreed to participate in an audience measurement research study. The monitored area 120 includes the area in which the television 106 is located and from which the one or more household member(s) 110 located in the monitored area 120 may view the television 106.

In the illustrated example, an audience measurement system 100 is used to collect audience measurement data concerning media activity associated with the metered household. To this end, an audience measurement device 108 is configured to collect media exposure information associated with one or more a media device(s) (e.g., the set top box 104 and the television 106) in the monitored area 120. The exposure information may be collected via wired connection(s) to the media device(s) and/or without such wired connection(s) (e.g., by monitoring audio and/or other detectible events in the viewing area). The audience measurement device 108 provides this exposure information, which may include detected codes associated with audio content, detected audio signals, collected signatures representative of detected audio signals, tuning and/or demographic information, etc. for evaluation in a back office 114. The information collected by the audience measurement device 108 may be conveyed to the back office 114 for evaluation by physically sending the audience measurement device 108 to the back office 114 for evaluation (e.g., transporting via a courier or the United States Postal Service) or, alternatively, via any other networking connection (e.g., an Ethernet connection, the Internet, a telephone line, etc.). The information collected in the audience measurement device 108 is processed and stored in the back office 114 to produce ratings information. In the illustrated example, the back office 114 includes an on/off identifier 116 to determine whether the media presentation device (e.g., the television 106) is in the on state or the off state and, thus, to determine whether media detected by the audience measurement device 108 should be counted as an audience exposure.

The media content provider 102 may convey the media content to a metered household via a cable network, a radio transmitter or one or more satellites. For example, the media content provider may be a cable television provider distributing the television programs exclusively via a cable network or a satellite provider distributing media via satellite. The media content provider 102 may transmit media signals in any suitable format, such as a National Television Standards Committee (NTSC) television signal format, a high definition television (HDTV) signal format, an Association of Radio Industries and Businesses (ARIB) television signal format, etc.

One or more user-operated remote control devices 112 (e.g., an infrared remote control device, a radio frequency remote control device, etc.) allow a viewer (e.g., the household member 110) to send commands to the television 106 and/or STB 104 requesting presentation of specific media content or broadcast channels provided by the media content provider 102. The remote control device(s) 112 may be designed to communicate with only a subset of the media devices (e.g., the television 106 and/or the set top box 104) from a single manufacturer, or the remote control device(s) 112 may be a universal remote control configured to communicate with some or all of the media devices in the metered household. For example, a universal remote control device 112 may allow an audience member 110 to cause both the television 106 and the set top box 104 to enter an on state and to configure themselves such that the television 106 displays media content supplied via the set top box 104.

In the illustrated example, the audience measurement device 108 is configured to collect information regarding the viewing behaviors of household members 110 by monitoring a non-acoustic signal (e.g., a video signal, an audio signal, an infrared remote control signal, etc.) and/or an acoustic signal (e.g., sound) within the monitored area 120. For example, the information collected may comprise an audio signal reflecting humanly audible and/or humanly inaudible sounds within the household recorded via a microphone coupled to or included in the audience measurement device 108. Additionally or alternatively, the collected information may include signals (e.g., infrared, radio frequency, etc.) generated by a remote control device 112. The audio recorded via the microphone of the audience measurement device 108 may comprise audio signals from the monitored media presentation device (e.g., the television 106) and/or background noise from within the monitored area 120. The remote control signals captured from the remote control device 112 may contain control information (e.g., channel tuning commands, power on/off commands, etc.) to control the monitored media device(s) (e.g., the set top box 104 and/or the television 106).

Periodically or a-periodically, the captured audience measurement device data is conveyed (e.g., the audience measurement device 108 is physically sent to the back office, the data collected is transmitted electronically via an Ethernet connection, etc.) to the back office 114 for processing. The back office 114 of the illustrated example extracts a signature from the audio captured via the microphone of the audience measurement device 108. One or more characteristics of the signatures are then analyzed alone or in conjunction with other data as explained below to produce crediting information regarding programs presented by a monitored media presentation device (e.g., a radio, a stereo, a STB 104, a television 106, a game console, etc.).

In the example media monitoring system, the on/off identifier 116 is implemented in the back office 114 and is configured to identify whether a media presentation device (e.g., the STB 104 and/or the television 106) is in an on state capable of actively presenting media content, or in an off state. The information regarding the on state or off state of the television is helpful in accurately processing the data captured by the audience measurement device 108. For example, the set top box 104 may be in an on state such that the set top box 104 continues to receive and output media content provided by the media content provider 102, while the television 106 may have been placed in an off state. Without the information provided by the on/off identifier 116, meaning the on state or the off state of the television 106, the media ratings generated in the back office 114 from the information gathered by the audience measurement device 108 might erroneously credit the media content as having been presented to the person 110 in the metered household, when in fact, the media was not presented and no media exposure occurred. Thus, the on/off identifier 116 may be used to improve the accuracy of media exposure measurements and ratings derived therefrom by determining whether the media content was actually presented to the person 110 within the monitored area 120.

Figure 2:
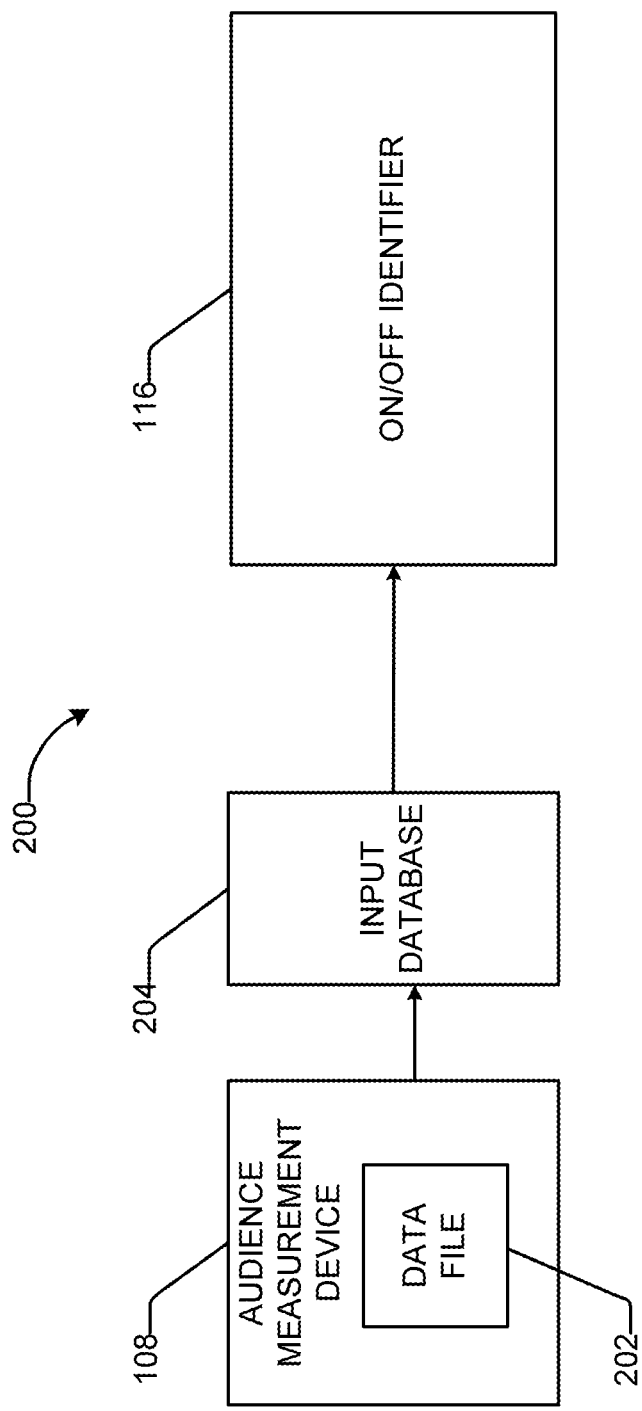
FIG. 2 is a block diagram of an example on/off identifier implemented in an example back office as illustrated in FIG. 1.

FIG. 2 is a block diagram of an example system 200 implemented within the back office 114 for processing data when the example audience measurement device 108 and/or the data collected thereby is returned from a monitored area 120. The example system 200 allows the example on/off identifier 116 to access data gathered by the audience measurement device 108 to determine whether the media presentation device 104, 106 was in the on state or the off state at the time the data was gathered. As described above, the audience measurement device 108 collects data (e.g., ambient audio, audio signals, video signals, remote control signals, etc.) in the metered monitored area 120. Subsequently the data is conveyed to the back office 114 to be utilized to generate media ratings information.

The audience measurement device 108 of the illustrated example stores the captured data within a data file 202 and then transfers the captured data file 202 to an input database 204 implemented in the back office 114. The data may, for example, be conveyed to the back office 114 via electronic means (e.g., transferring via an Ethernet connection) or physical means (e.g., transporting the audience measurement device to the back office 114). The data stored within the input database 204 is processed to create, for example, an audio signature for use in identifying media presented to the meter 108 and/or other information (e.g., tuning information, program identification codes, etc.) used to identify the media. Alternatively, audio signatures may be determined by the audience measurement device 108 and included in the data file 202. Any mechanism for identifying media content based on the data collected by the audience measurement device 108 can be employed without departing the scope of this disclosure. Therefore, media content identification mechanisms (e.g., program identification metering, signature metering, etc.) will not be further described herein. In the illustrated example, the on/off identifier 116 obtains data (e.g., the audio signal, the signature, a characteristic of the signature, the remote control event record(s), etc.) from the input database 204 to determine whether the media presentation device (e.g., the television 106) is in the on state or the off state.

The data captured by the audience measurement device 108 may be stored in the data file 202 in any format (e.g., an American Standard Code for Information Interchange (ASCII) format, a binary format, a raw data format, etc.) for storing data on an electronic medium (e.g., a memory or a mass storage device). The electronic medium may be a non-volatile memory (e.g., flash memory), a mass storage device (e.g., a disk drive), a volatile memory (e.g., static or dynamic random access memory) and/or any combination of the memory types. For example, the data file 202 may be stored in binary format on a random access memory 2108 communicatively coupled to a processor 2102 within a processor system 2100, such as the processor system 2100 described in detail below in conjunction with FIG. 21.

In some example implementations, the data captured by the audience measurement device 108 may undergo some or all of the on/off detection processing (e.g., determining an audio signature) within the audience measurement device 108 itself, with the results being stored within the data file 202 within the audience measurement device 108.

Figure 3:
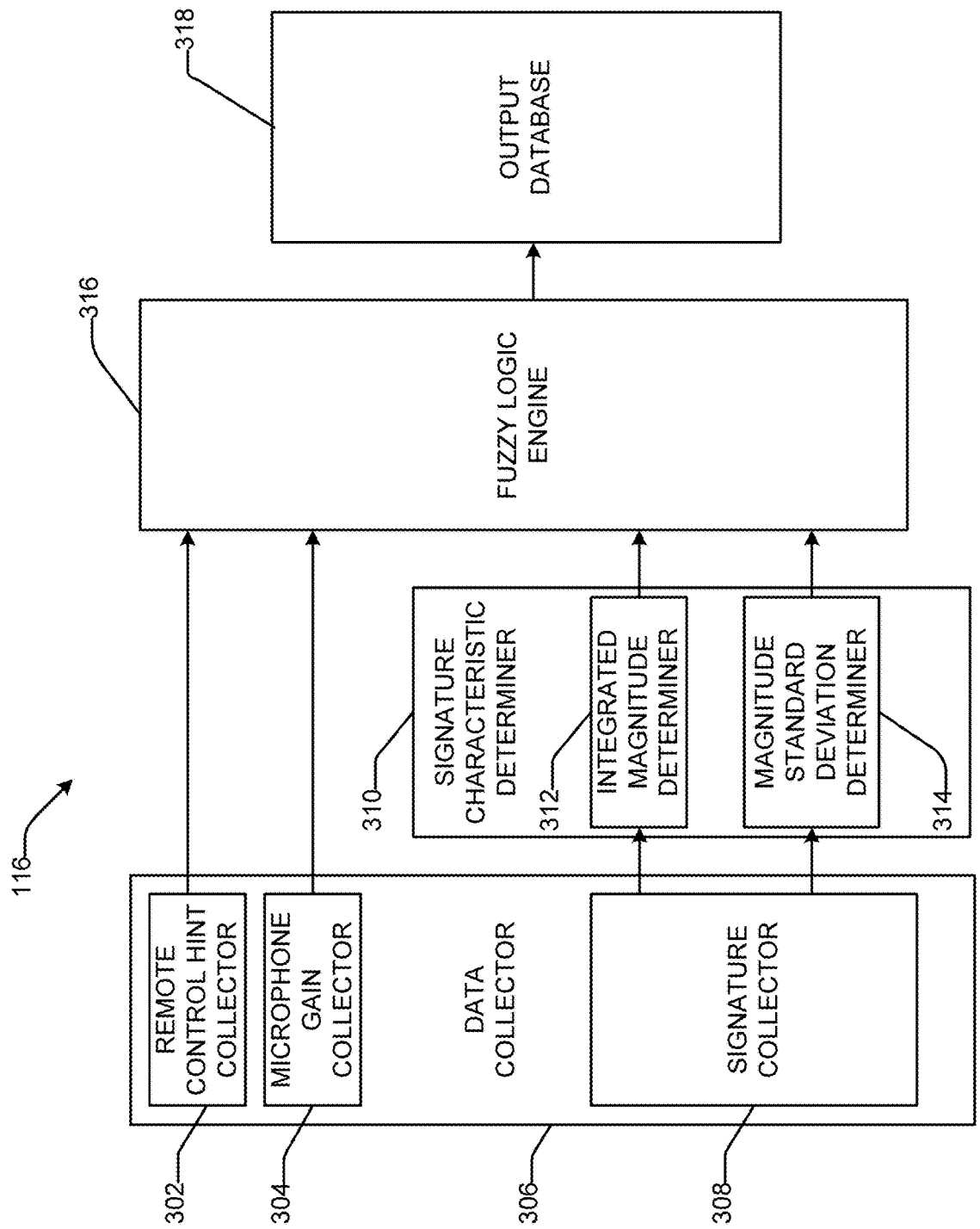
FIG. 3 is a more detailed illustration of the example on/off identifier of FIGS. 1 and 2.

A block diagram of an example implementation of the on/off identifier 116 of FIGS. 1 and 2 is depicted in FIG. 3. The example on/off identifier 116 includes a data collector 306, a signature characteristic determiner 310, a fuzzy logic engine 316 and an output database 318. The example data collector 306 collects data (e.g., audio gain data, remote control hints, audio signatures, etc.) from the example input database 204 containing data obtained from, for example, the metered household 120 with the audience measurement device 108. The signature characteristic determiner 310 determines a characteristic of a signature obtained or determined from data in the input database 204. For example, while the signature may be created during analysis in the back office 114, the signature generation functionality may alternatively be integrated into the audience measurement device 108 and the resulting determined signature transferred to the example input database 204 (e.g., in the data file 202).

The example fuzzy logic engine 316 of FIG. 3 identifies whether the monitored media presentation device 104,106 is in the on state or the off state. An example implementation of the fuzzy logic engine 316 is described in detail below in conjunction with FIG. 4A. The on/off states identified by the fuzzy logic engine 316 are stored in the output database 318 and made available for further analysis (e.g., of the data collected with the audience measurement device 108).

While the input database 204 (FIG. 2) and the output database 318 are depicted as separate blocks within the back office 116, their respective functionality may be incorporated within a single database or implemented with two or more databases. Furthermore, the input database 204 of FIG. 2 and the output database 318 of FIG. 3 may be implemented as any type of database (e.g., a delimited flat file database or a structured query language (SQL) relational database) and stored utilizing any data storage method (e.g., a flash memory, a mass storage device, static or dynamic random access memory, etc.).

The example data collector 306 of FIG. 3 includes a remote control hint collector 302, a microphone gain collector 304 and a signature collector 308. The remote control hint collector 302 collects hints associated with the operation of a remote control device (e.g., the remote control 112) within a metered viewing area (e.g., the metered monitored area 120) from the data file 202. The hints may comprise any communication between the remote control device 112 and a monitored media device (e.g., the television 106 or the set top box 104) collected by an audience measurement device (e.g., the audience measurement device 108). For example, the remote control 112 may transmit commands entered by a person 110 to a television 106 via infrared signals. The audience measurement device 108 of the illustrated example is configured to capture the infrared commands and store the captured commands in the data file 202 (FIG. 2) along with a time stamp indicating when the data was captured and stored. The remote control hint collector 302 of FIG. 3 collects hints from the stored data to be analyzed by the fuzzy logic engine 316.

The microphone gain collector 304 of the illustrated example collects the gain information associated with a microphone of the audience measurement device 108 from the input database 204 for analysis by the fuzzy logic engine 316. As noted above, the microphone captures ambient audio present in the monitored area 120. This audio includes any audio output of the monitored media presentation device (e.g., the television 106, a stereo (not shown), etc.) and other background noise (e.g., noise generated inside or outside the monitored area 120, conversations among the household members, etc.). The gain applied to the microphone is inversely proportional to the amplitude of the audio captured by the microphone. A high level of gain corresponds with a low level of ambient audio captured by the microphone. Conversely, a low level of gain corresponds with a high level of audio captured by the microphone.

As described above, the audio signal output by the microphone may be analyzed either in the audience measurement device 108 or in the back office 114 to determine an audio signature associated with media content presented by, for example, the television 106. The signature is then compared to reference signatures related to known programming provided by the media content provider 102. When a signature associated with the monitored audio signal is found to match with a reference signature, the program associated with the reference signature is identified as the media content presented by the television 108 and used in generating the media ratings data.

The signature collector 308 of FIG. 3 collects the audio signature from the input database 204 or from a signature generator (not shown) configured to process audio data stored in the input data base 204. The signature characteristic determiner 310 of the illustrated example determines a characteristic associated with the signature for analysis by the fuzzy logic engine 316. In particular, the example signature characteristic determiner 310 determines and/or derives the magnitude associated with the signature. The magnitude of a signature will vary over time, depending on the type of signature employed. In the illustrated example, the signature reflects, for example, time domain variations of the audio signal captured by the audience measurement device 108. Accordingly, the magnitude of the signature reflects variations of the audio amplitude. To reduce the time varying magnitude for a given time period to a single value, the signature characteristic determiner 310 includes an integrated magnitude determiner 312. The integrated magnitude determiner 312 integrates the magnitude of the signature over the period of time. The integrated magnitude may serve as the characteristic of the system utilized by the fuzzy logic engine 315 as described below. Alternatively or additionally, the signature magnitude may be analyzed by the magnitude standard deviation determiner 314 to determine a standard deviation of the magnitude associated with the signature over the period of time. In example apparatus employing a magnitude standard deviation determiner 314, the standard deviation may serve as the characteristic used by the fuzzy logic engine 316.

The fuzzy logic engine 316 analyzes the data (e.g., the remote control hints, the microphone gain, the integrated magnitude of the signature and/or the standard deviation of the magnitude of the signature) collected by the data collector 306 and/or determined by the signature characteristic determiner 310 to identify whether the monitored media presentation device 104,106 is in the on state or the off state. Once the on state or off state is determined by the fuzzy logic engine 316, the states are stored in the output database 318. The states are stored in association with timestamps reflecting the time at which the corresponding signature occurred. The example on/off identifier 118 utilizes a fuzzy logic engine 316 to determine the on state or the off state, but any other analysis method may be used.

While an example manner of implementing the on/off identifier 116 of FIGS. 1-2 has been illustrated in FIG. 3, one or more of the elements, blocks and/or devices illustrated in FIG. 3 may be combined, divided, re-arranged, omitted, eliminated and/or implemented in any other way. Further, the example data collector 306, the example remote control hint collector 302, the example microphone gain collector 304, the example signature collector 308, the example signature characteristic determiner 310, the example integrated magnitude determiner 312, the example magnitude standard deviation determiner 314, the example fuzzy logic engine 316, and/or the example output database 318 and/or, more generally, the on/off identifier 116 of FIGS. 1-3 may be implemented by hardware, software, firmware and/or any combination of hardware, software and/or firmware. Thus, for example, any of the example data collector 306, the example remote control hint collector 302, the example microphone gain collector 304, the example signature collector 308, the example signature characteristic determiner 310, the example integrated magnitude determiner 312, the example magnitude standard deviation determiner 314, the example fuzzy logic engine 316, the example output database 318 and/or, more generally, the example on/off identifier 116 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example data collector 306, the example remote control hint collector 302, the example microphone gain collector 304, the example signature collector 308, the example signature characteristic determiner 310, the example integrated magnitude determiner 312, the example magnitude standard deviation determiner 314 the example fuzzy logic engine 316, and/or the example output database 318 are hereby expressly defined to include a tangible medium such as a memory, DVD, CD, etc. storing the software and/or firmware. Further still, the on/off identifier of FIGS. 1-3 may include one or more elements, processes and/or devices in addition to, or instead of, those illustrated in FIG. 3, and/or may include more than one of any or all of the illustrated elements, processes and devices.

Figure 4A:
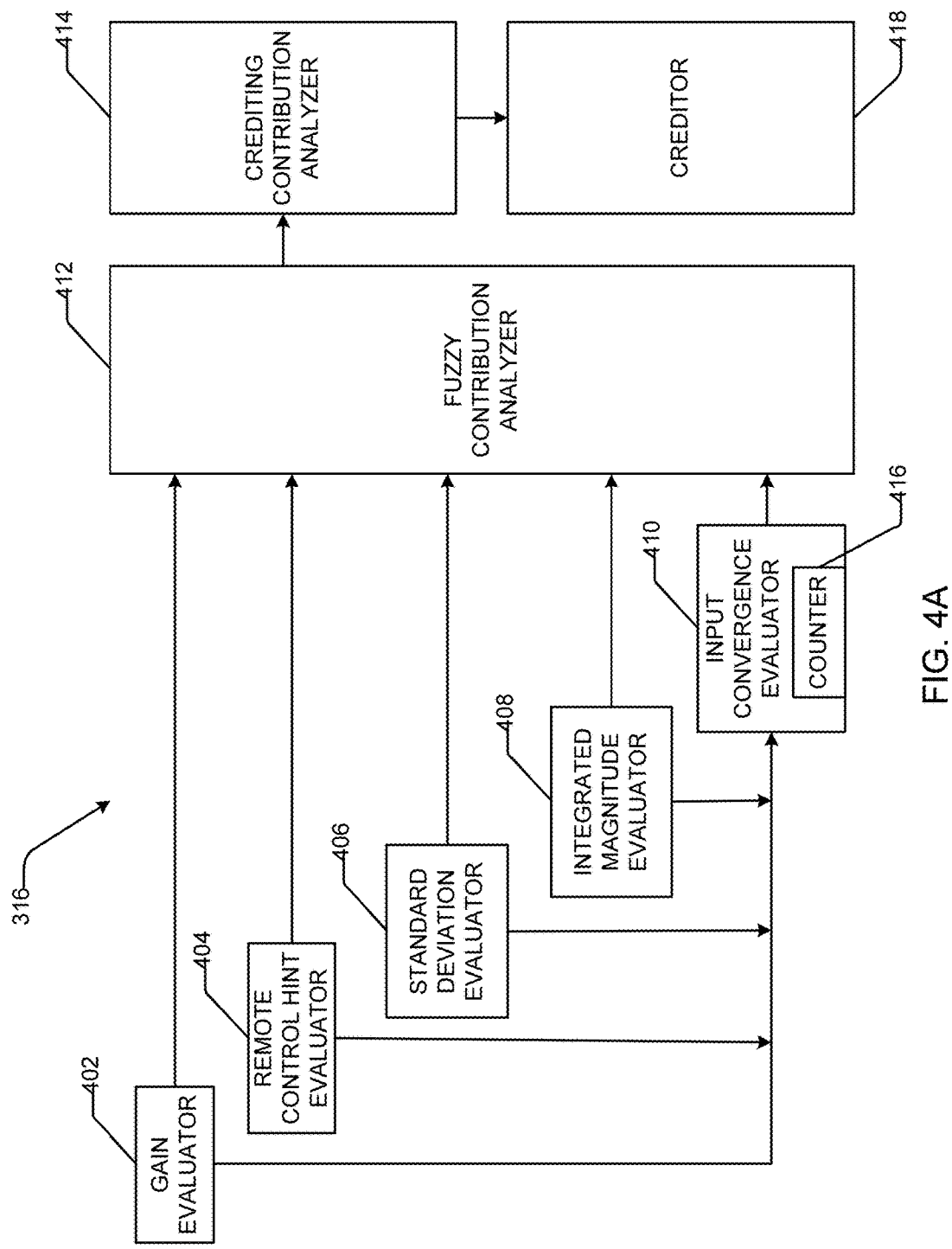
FIG. 4A is a detailed illustration of an example fuzzy logic engine that may be used to implement the example on/off identifier of FIG. 3

A block diagram depicting an example implementation of the example fuzzy logic engine 316 of FIG. 3 is illustrated in FIG. 4A. The example implementation of the fuzzy logic engine 316 comprises a gain evaluator 402, a remote control hint evaluator 404, a standard deviation evaluator 406, an integrated magnitude evaluator 408, an input convergence evaluator 410, a fuzzy contribution analyzer 412 and a crediting contribution analyzer 414. The example fuzzy logic engine 316 may be implemented using any desired combination of hardware, firmware and/or software. For example, one or more integrated circuits, processing devices, discrete semiconductor components and/or passive electronic components may be used to implement the example fuzzy logic engine 316.

Generally, the fuzzy logic engine 316 is designed to analyze data collected via the audience measurement device 108 to determine whether a monitored media presentation device 104, 106 was in an on state or an off state during time intervals within a monitored period. More specifically, the example audience measurement device 108 captures data (e.g., ambient audio, an audio signal, a remote control event record, etc.) at specific intervals (e.g., at 0.5 second increments) within the sampling period (e.g., one month) and stores the data in the data file 202 along with a timestamp corresponding with the time and date the data was captured. When transferred to the input database 204, the timestamps remain associated with the corresponding captured data and, preferably, with the data derived therefrom. The fuzzy logic engine 316 operates at an engine cycle corresponding to a time interval of, for example, 2 seconds, and separately evaluates the data captured for each engine cycle.

For each engine cycle, each of the gain evaluator 402, the remote control hint evaluator 404, the standard deviation evaluator 406, and the integrated magnitude evaluator 408 evaluates the corresponding data collected by the data collector 306 and/or the signature characteristic(s) determined by the signature characteristic determiner 310 to generate a fuzzy contribution value. In the illustrated example, the gain evaluator 402 generates a first fuzzy contribution value, the remote control hint evaluator 404 generates a second fuzzy contribution value, the standard deviation evaluator 406 generates a third fuzzy contribution value and the input convergence evaluator 408 generates a fourth fuzzy contribution value.

Additionally, the input convergence evaluator 410 further evaluates each of the generated fuzzy contribution values (e.g., the first fuzzy contribution value, the second fuzzy contribution value, the third fuzzy contribution value and the fourth fuzzy contribution value) to determine whether the first, second, third and fourth fuzzy contribution values converge toward an indication of an on state (e.g., a positive value). The input convergence evaluator 410 increments an audio test score value by the number of fuzzy contribution values that converge toward an on state. If the input convergence evaluator 410 determines that the evaluated first, second, third and fourth fuzzy contribution value converges towards an indication of an off state (e.g., a negative value), the audio test score is not incremented. After adjusting the audio test score, the input convergence evaluator 410 also analyzes the audio test score value to determine a fifth fuzzy contribution value associated with the number of evaluators that converge to (e.g., indicate) an on state. A new audio test score is calculated for each engine cycle. The audio test score and the first through fifth fuzzy contribution values are specific to each engine cycle.

After a period of time encompassing several engine cycles (e.g., twenty four hours), the first, second, third, fourth and fifth fuzzy contribution values generated by the gain evaluator 402, the remote control hint evaluator 404, the standard deviation evaluator 406, the integrated magnitude evaluator 408, and the input convergence evaluator 410, respectively, are further analyzed to generate a record corresponding to the operating state(s) (e.g., the on state or the off state) of the monitored media presentation device during the example twenty four hour period.

The example gain evaluator 402 to evaluates a gain signal collected by the microphone gain collector 304 from the input database 204 (FIG. 2). The gain evaluator 402 outputs the first fuzzy contribution value to be analyzed by the fuzzy contribution analyzer 412 and by the input convergence evaluator 410. The gain signal evaluated by the gain evaluator 402 of the illustrated example may comprise a range of values corresponding to a decibel (dB) range captured by a microphone over a period of time. For example, a mailable meter provided by The Nielsen Company, Inc., includes a microphone and is capable of applying a gain in the range of 0 dB to a maximum of 59.5 dB to the microphone in step increments of 0.5 dB per step.

In the evaluation process, the gain evaluator 402 examines the gain value for the engine cycle and generates a first fuzzy contribution value associated with the same engine cycle. The first fuzzy contribution value is proportional to the gain input value in decibels. The gain evaluator 402 generates a positive first fuzzy contribution value for small gain values, because small gain values imply a high volume audio signal. Conversely, a large gain value implies a low volume audio signal and, thus, the gain evaluator 402 generates a negative first fuzzy contribution value proportional to the gain input value in decibels. Additionally, a microphone may capture a high volume level when a person or persons are speaking within a metered viewing area (e.g., the monitored area 120) or when a media device (e.g., the television 106) is producing a high volume audio output. Consequently, the positive contribution of the gain value is limited to a maximum first fuzzy contribution value. A negative first fuzzy contribution value, corresponding to low volume levels, is not limited to a minimum value The remote control hint evaluator 404 of the illustrated example evaluates a series of remote control hints collected by the remote control hint collector 302. The remote control hints correspond with, for example, commands issued by the participating viewer 110 to a monitored media device 104 and/or 106 via the remote control device 112. Hints contribute to the second fuzzy contribution value when a hint implies that the household member 110 was exposed to media content presented via the monitored media presentation device 104, 106. For example, a hint implies that the household member was exposed to media content presented via the media presentation device 104, 106 when the hint occurs (1) within fifteen minutes of a second hint and (2) the second hint occurs within (plus or minus) fifteen minutes of the current evaluated time (e.g., the time associated with the current engine cycle). This rule assumes that an active audience member will use the remote control to adjust the monitored media presentation device(s) 104 and/or 106 at least twice every 30 minutes.

The standard deviation evaluator 406 of the illustrated example evaluates a standard deviation of a magnitude of a signature, as determined by, for example, the magnitude standard deviation determiner 314 over a time period (e.g., 15 seconds). The standard deviation of the magnitude of a signature may be highly variable, so the values output from the magnitude standard deviation determiner 314 represent lower bound standard deviation (LBSD) values calculated (e.g., filtered) over a period of time. In some example implementations of the standard deviation determiner 314, the standard deviation value of the current engine cycle is inserted into a lower bound filter. The example filter may be implemented via a circular buffer (e.g., a first-in-first-out buffer with 120 elements) that outputs the minimum value contained within the buffer as the LBSD. The filtered output from the magnitude standard deviation determiner 314 (i.e., the LBSD) is then evaluated in the standard deviation evaluator 406. The standard deviation evaluator 406 determines the third fuzzy contribution value via an equation that may be determined through an examination of experimental results. For example, experimental results have indicated that an off state corresponds to very low standard deviation values (e.g., under 10) and an on state correlates to standard deviation values within an intermediate range (e.g., between 10 and 20). From these results, an example equation may be inferred where an LBSD value greater than a threshold within the indication range of an on state, (e.g., +15) generate a positive third fuzzy contribution value, and an LBSD value less that the threshold generates a negative third fuzzy contribution value. Additionally, the experimental results demonstrated that an off state also corresponded to very high standard deviation values (e.g., greater than 35), so another example equation may incorporate this experimental result as an additional way to determine the third fuzzy contribution value.

The integrated magnitude evaluator 408 of the illustrated example evaluates the signal output by the integrated magnitude determiner 312. The output signal of the integrated magnitude determiner 312 represents an integrated magnitude of a signature over a period of time. The integrated magnitude evaluator 408 generates the fourth fuzzy contribution value by evaluating an first equation corresponding to the integrated magnitude value, for example, subtracting a first constant (e.g., 55) from the integrated magnitude value The first constant represents a threshold value of the integrated magnitude representing the lowest end of a range of experimentally determined values that indicate an on state of a media presentation device. For example, experimental results from an example implementation depicted in FIG. 18 demonstrate that an on state corresponds with integrated magnitude values in a range between +55 and +95 and an off state corresponds with integrated magnitude values in the range between −21 and +22). The fourth fuzzy contribution value is set equal to the value of the integrated magnitude less the first constant if that difference is positive. A negative fourth fuzzy contribution value is also possible. In particular, if the difference between the integrated magnitude and the first constant is negative, the difference may be multiplied by a second constant value (e.g., 2) and/or evaluated with a second equation to cause the negative fourth fuzzy contribution of the integrated magnitude evaluator 408 to have a greater influence in the analysis performed by the fuzzy contribution analyzer 412. A negative fourth fuzzy contribution value may be due to, for example, a change in gain of the audio signal used to create the signature or a change in, or occurring during, a normalization process for the signature.

Each of the first fuzzy contribution value, the second fuzzy contribution value, the third fuzzy contribution value and the fourth fuzzy contribution value is evaluated in the input convergence evaluator 410 to generate a fifth fuzzy contribution. The fifth fuzzy contribution value indicates the number of evaluators that generated a positive fuzzy contribution value (e.g., converged to the on state indication) for the evaluated engine cycle. More specifically, at the start of each engine cycle an audio test score counter 416 within the input convergence engine 410 is initialized (e.g., set to a null value). Next, the example input convergence evaluator 410 examines the first fuzzy contribution value output from the gain evaluator 402. If the first fuzzy contribution value is positive (e.g., a value greater than 0), then the first fuzzy contribution value converges towards the on state indication and the audio test score counter 416 is incremented. Conversely, if the first fuzzy contribution value is a value of zero or less (e.g., a negative value), the audio test score counter 416 is not incremented due to the evaluation of the first fuzzy contribution value.

The example input convergence evaluator 410 then examines the second fuzzy contribution value output from the remote control hint evaluator 404. If the second fuzzy contribution value is positive (e.g., a value greater than 0), then the second fuzzy contribution value converges towards the on state indication and the audio test score counter 416 is incremented. Conversely, if the second fuzzy contribution value is a value of zero or less (e.g., a negative value), the audio test score counter 416 is not incremented due to the evaluation of the second fuzzy contribution value.

The example input convergence evaluator 410 then examines the third fuzzy contribution value output from the standard deviation evaluator 406. If the third fuzzy contribution value is positive (e.g., a value greater than 0), then the third fuzzy contribution value converges towards the on state indication and the audio test counter 416 is incremented. Conversely, if the third fuzzy contribution value is a value of zero or less (e.g., a negative value), the audio test score counter is not incremented as a result of the evaluation of the third fuzzy contribution value.

The example input convergence evaluator 410 then examines the fourth fuzzy contribution value output from the integrated magnitude evaluator 408. If the fourth fuzzy contribution value is positive (e.g., a value greater than 0), then the fourth fuzzy contribution value converges towards the on state indication and the audio test score counter 416 is incremented. Conversely, if the fourth fuzzy contribution value is a value of zero or less (e.g., a negative value), the audio test score counter 416 is not incremented as a result of the evaluation of the fourth fuzzy contribution value.

The value in the audio score counter 416 is then analyzed by the input convergence evaluator 410 to identify the number of evaluators that generated a positive fuzzy contribution value for the evaluated engine cycle. In particular, the input convergence evaluator 410 generates a fifth fuzzy contribution value that is proportional to the number of evaluators that incremented the audio test score value (e.g., the number of evaluators that had positive fuzzy contribution values). The input convergence evaluator 410 generates the fifth fuzzy contribution value by assigning a negative value to the fifth fuzzy contribution value when two or less evaluators incremented the audio test score counter 416 (i.e., the counter 416 has a value of 2 or less) or a positive value to the fifth fuzzy contribution value when three or more evaluators incremented the audio test score counter 416 (i.e., the counter 416 has a value of 3 or more). In the illustrated example, if the value in the audio test score counter 416 is zero, then the fifth fuzzy contribution value is assigned a value of −40, if the value in the audio test score counter 416 is 1, the fifth fuzzy contribution value is assigned a value of −30, if the value in the audio test score counter 416 is three, then the fifth fuzzy contribution value is assigned a value of +10, and if the value in the audio test score counter 416 is four, then the fifth fuzzy contribution value is assigned a value of +30.

The fuzzy contribution analyzer 412 of the example fuzzy logic engine 316 analyzes the first, second, third, fourth and fifth fuzzy contribution values produced by the aforementioned evaluators 402-410. For each engine cycle, the fuzzy contribution analyzer 412 sums or otherwise combines the first, second, third, fourth and fifth fuzzy contribution values from the gain evaluator 402, the remote control hint evaluator 404, the standard deviation evaluator 406, the integrated magnitude evaluator 408 and the input convergence evaluator 410, respectively, and stores the combined value as an intermediate fuzzy score. The intermediate fuzzy score may be positive or negative and represents a sum of the first, second, third, fourth and fifth fuzzy contributions for the engine cycle. The intermediate fuzzy score is stored, for example, in a buffer or in any other manner with the intermediate fuzzy score values of previous engine cycles. Subsequently, the fuzzy contribution analyzer 412 processes the stored intermediate fuzzy score values for a specified first time period (e.g., 15 seconds) to discard outliers, (e.g., with any outlier determination algorithm). Following the removal of the outliers, the remaining intermediate fuzzy score values are averaged to determine a final fuzzy score value that correlates with either an on state (e.g., a positive value) or an off state (e.g., a negative value) of the evaluated engine cycle.

Figure 4B:
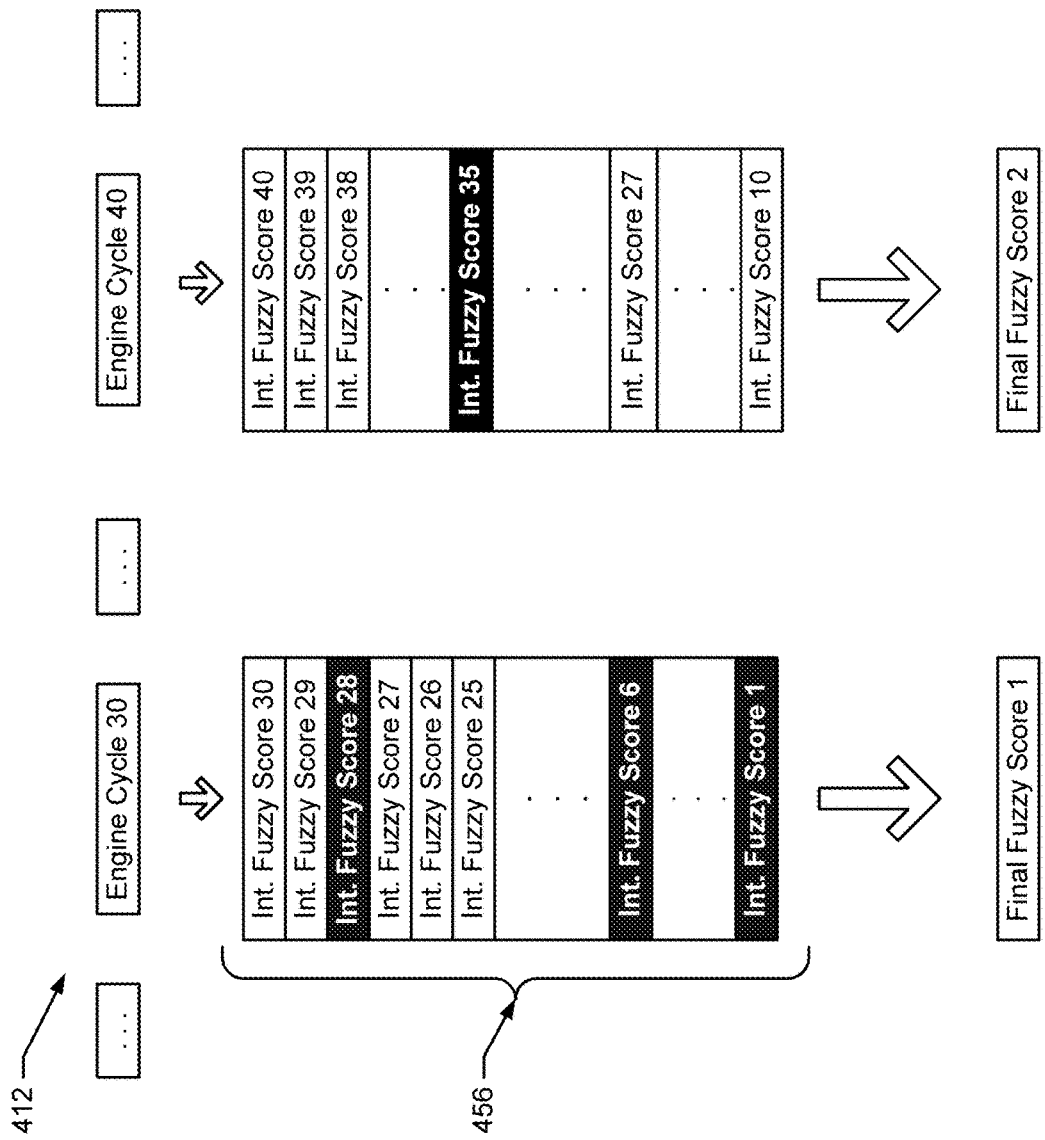
FIG. 4B is a representation of data flow through an example buffer during operation of an example fuzzy contribution analyzer implemented in the example fuzzy logic engine of FIG. 4A.

FIG. 4B depicts data flow through the circular buffer 456 during operation of the example fuzzy contribution analyzer 412 to determine the final fuzzy score value. In the example of FIG. 4B, two instances in time are shown. A first time instance is reflected in the leftmost image/column. A second instance that occurs ten engine cycles after the first instance is shown in the rightmost image/column. As previously mentioned the fuzzy contribution analyzer 412 sums and/or combines the first, second, third, fourth, and fifth fuzzy contribution values each engine cycle into an intermediate fuzzy score. The intermediate fuzzy score produced by each engine (e.g., intermediate fuzzy score 30 for engine cycle 30) is inserted into the circular buffer 456. In the example of FIG. 4B, the circular buffer 456 stores 30 elements. Thus, the intermediate fuzz scores for engine cycles 1-30 are shown in the buffer 456. When the buffer 456 is full, the most recent intermediate fuzzy score overwrites or otherwise replaces the oldest value within the buffer 456. In the example of FIG. 4B, if there was an engine cycle 0, the intermediate fuzzy score 30 would have replaced the intermediate fuzzy score from engine cycle 0 (i.e., the engine cycle that occurred 30 cycles ago).

As mentioned above, the example circular buffer 456 contains thirty elements. Each of the elements contains an intermediate fuzzy score determined during an individual engine cycle (e.g., a first engine cycle corresponds with a first intermediate fuzzy score, a second engine cycle corresponds with a second intermediate fuzzy score, etc.). Since in the illustrated example, each engine cycle has an associated time of two seconds, the circular buffer 456 with thirty elements corresponds to sixty seconds of intermediate fuzzy scores.

The fuzzy contribution analyzer 412 of the illustrated example periodically (e.g., once every ten seconds) processes the intermediate fuzzy scores in the circular buffer 456 to remove outliers 458. The outliers may be removed, for example, by using the example machine readable instructions discussed in conjunction with FIG. 15 below. For example, three outliers, namely, the intermediate fuzzy score 1, the intermediate fuzzy score 6 and the intermediate fuzzy score 28, are discarded from the buffer 456 upon completion of engine cycle 30. Once the outliers 458 are discarded at the end of engine cycle 30, the remaining intermediate fuzzy scores in the circular buffer 456 are averaged to determine the final fuzzy score 1.

The above process continues with the circular buffer 454 being filled and/or overwritten each engine cycle, and the outliers being discarded and the final fuzzy score being calculated every ten seconds. In the example of FIG. 4A, after completion of engine cycle 40, outlier 35 is eliminated and the final fuzzy score 2 is determined.

Returning to FIG. 4A, the final fuzzy score values described above are further processed by the fuzzy contribution analyzer 412 in a normalization and filtering process. Generally, the normalization and filtering process performed by the fuzzy contribution analyzer 412 (1) examines the final fuzzy score values determined for a given time (e.g., twenty-four hour) period, (2) determines the minimum final fuzzy score value and maximum final fuzzy score value for the time period, and (3) generates a correction amount value proportional to the difference between the minimum and maximum values that may be applied to each final fuzzy score for the above-mentioned time period. The normalized final fuzzy scores may then be analyzed with a smoothing filter, an extrema engine, etc. An example extrema engine determines the largest absolute final fuzzy score value for the time period (e.g., a time period associated with thirty normalized final fuzzy score values) and assigns the determined largest absolute final fuzzy score value to each of the thirty final fuzzy score values within the analyzed time period.

Once the fuzzy contribution analyzer 412 determines the normalized and filtered final fuzzy score values, the crediting contribution analyzer 414 employs the program identification data generated based on the information collected via the audience measurement device 108 (FIG. 1) to adjust the final fuzzy contribution values. In particular, if a given final fuzzy score is associated with a time period during which the media content is positively identified (e.g., the collected signature matches a reference in the signature reference database), the crediting contribution analyzer 414 increases the final fuzzy score by a predetermined amount (e.g., by adding a constant such as 150 to the final fuzzy score). If, on the other hand, the given final fuzzy score is associated with a time period during which the media content is not positively identified (e.g., the collected signature does not match a reference in the signature reference database), the crediting contribution analyzer 414 decreases the final fuzzy score by a predetermined amount (e.g., by subtracting a constant such as 150 from the final fuzzy score).

After the crediting contribution analyzer 414 has adjusted the final fuzzy scores based on the crediting result, the example creditor 418 examines the final fuzzy score values over a time period (e.g., 10 or 15 seconds) to determine whether or not the monitored information presentation device was in an on state or an off state and, thus, whether a program associated with the time period should be credited as an actual exposure to media content. The creditor 418 determines a start time (e.g., a time associated with the metered data) and gathers media exposure data, from the data file 202. The creditor 418 retrieves a timestamp associated with the gathered media exposure data to determine the final fuzzy value corresponding to the timestamp. Next, the creditor 418 analyzes the final fuzzy value to determine whether the media presentation device was in an on state or an off state. If the media presentation device was off, then the creditor 418 marks the media exposure data as not being exposed to a viewer to ensure that the data is not credited as a media exposure of the household member 110 prior to loading the next media exposure data to be analyzed.

While an example manner of implementing the fuzzy logic engine 316 of FIG. 3 has been illustrated in FIG. 4A, one or more of the elements, processes and/or devices illustrated in FIG. 4A may be combined, divided, re-arranged, omitted, eliminated and/or implemented in any other way. Further, the example gain evaluator 402, the example remote control hint evaluator 404, the example standard deviation evaluator 406, the example integrated magnitude evaluator 408, the example input convergence evaluator 410, the example fuzzy logic contribution analyzer 412, the example crediting contribution analyzer 414 and/or the creditor 418 and/or, more generally, the example fuzzy logic engine 316 of FIG. 4A may be implemented by hardware, software, firmware and/or any combination of hardware, software and/or firmware. Thus, for example, any of the example gain evaluator 402, the example remote control hint evaluator 404, the example standard deviation evaluator 406, the example integrated magnitude evaluator 408, the example input convergence evaluator 410, the example fuzzy logic contribution analyzer 412 and/or the example crediting contribution analyzer 414 and/or, more generally, the example fuzzy logic engine 316 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example gain evaluator 402, example remote control hint evaluator 404, example standard deviation evaluator 406, example integrated magnitude evaluator 408, example input convergence evaluator 410, example fuzzy logic contribution analyzer 412 and/or the example crediting contribution analyzer 414 are hereby expressly defined to include a tangible medium such as a memory, DVD, CD, etc. storing the software and/or firmware. Further still, the example fuzzy logic engine 316 of FIG. 4A may include one or more elements, processes and/or devices in addition to, or instead of, those illustrated in FIG. 4A, and/or may include more than one of any or all of the illustrated elements, processes and devices.

Flowcharts representative of example machine readable instructions that may be executed to implement the on/off identifier 116 of FIGS. 1-4A are shown in FIGS. 5 through 15. In these examples, the machine readable instructions represented by each flowchart may comprise one or more programs for execution by: (a) a processor, such as the processor 2102 shown in the example processor system 2100 discussed below in connection with FIG. 21, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 2102, but the entire program or programs and/or portions thereof could alternatively be executed by a device other than the processor 2102 and/or embodied in firmware or dedicated hardware (e.g., implemented by an application specific integrated circuit (ASIC), a programmable logic device (PLD), a field programmable logic device (FPLD), discrete logic, etc.). In addition, some or all of the machine readable instructions represented by the flowchart of FIGS. 5 through 15 may be implemented manually. Further, although the example machine readable instructions are described with reference to the flowcharts illustrated in FIGS. 5 through 15, many other techniques for implementing the example methods and apparatus described herein may alternatively be used. For example, with reference to the flowcharts illustrated in FIGS. 5 through 15, the order of execution of the blocks may be changed, and/or some of the blocks described may be changed, eliminated, combined and/or subdivided into multiple blocks.

Figure 5:
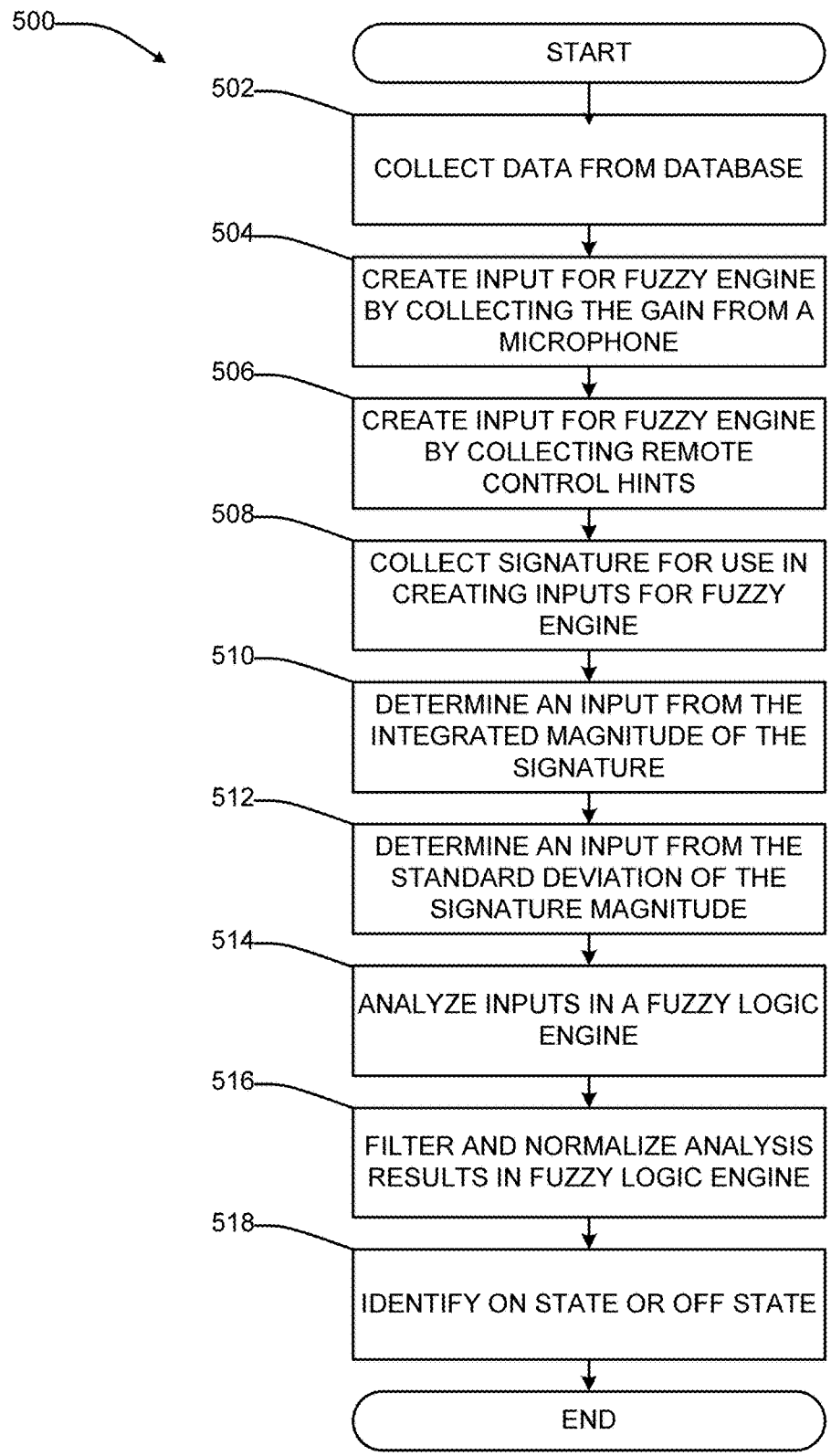
FIG. 5 is a flow diagram representative of example machine readable instructions that may be executed to implement the example on/off identifier of FIGS. 1-3 and/or 4.

Example machine readable instructions 500 that may be executed to implement the on/off identifier 116 of FIGS. 1-4A, including the example data collector 306, the example remote control hint collector 302, the example microphone gain collector 304, the example signature collector 308, the example signature characteristic determiner 310, the example integrated magnitude determiner 312, the example magnitude standard deviation determiner 314, the example fuzzy logic engine 316, and/or the example output database 318, the example gain evaluator 402, the example remote control hint evaluator 404, the example standard deviation evaluator 406, the example integrated magnitude evaluator 408, the example input convergence evaluator 410, the example fuzzy logic contribution analyzer 412, the example crediting contribution analyzer 414 and/or the creditor 418 are represented by the flowchart shown in FIG. 5. The example machine readable instructions 500 are executed to determine whether a media presentation device (e.g., the STB 104 and/or the television 106) located within a monitored viewing area (e.g., the monitored area 120) and monitored via an audience measurement device (e.g., the audience measurement device 108) is in an on state or an off state. While the example machine readable instructions 500 are shown to be executed within a back office (e.g., the back office 114 of FIG. 1), the instructions may be executed anywhere that the data collected via the audience measurement device 108 may be accessed. For example, the example machine readable instructions 500 may be executed within the audience measurement device 108. Furthermore, the example machine readable instructions 500 may be executed at periodic or aperiodic intervals, based on an occurrence of a predetermined event (e.g., a full or nearly full memory), etc., or any combination thereof.

The example machine readable instructions 500 of FIG. 5 initially cause the data collector 306 of the on/off identifier 116 to extract and/or collect data (e.g., a microphone gain record, a remote control hint record, a signature record, etc.) from the input database 204 containing audience measurement data collected at the monitored area 120 with the audience measurement device 108 (block 502). The microphone gain collector 304 of the on/off identifier 116 then extracts a gain applied to a microphone associated with the audience measurement device 108 from the input database 204 (block 504). The gain collected from the input database 204 may, for example, represent the actual gain applied to the microphone while collecting audio in the metered monitored area 120 or may be additionally processed (e.g., filtered). Next, the remote control hint collector 302 collects remote control hint(s) corresponding to the remote control commands captured by the audience measurement device 108 corresponding to the remote control 112 operated by a person (e.g., the household member 110) (block 506). The remote control hint collector 302 collects the remote control hints from the input database 204.

Next, the signature collector 308 of the on/off identifier 116 collects a signature from the input database 204, determines a characteristic of the signature (e.g., the magnitude of the signature) and creates inputs to be analyzed (blocks 508-512). For example, the signature collector 508 of the illustrated example collects a signature stored in the input database 204 and extracted from ambient audio recorded by the audience measurement device 108 (block 508). Alternatively, the signature can be extracted from audio obtained from a wired connection to the STB 104 and/or the television 106. The integrated magnitude determiner 312 of the signature characteristic determiner 310 integrates the magnitude of the signature over a period of time (e.g., 7.5 seconds) (block 510). A standard deviation signature characteristic determiner 314 determines a value representing the standard deviation of the magnitude for the same or a different period of time (e.g., 15 seconds) (block 512).

The determined at blocks 502-512 are then analyzed via the example fuzzy logic engine 316 to generate the fuzzy logic values described above (block 514). Following the analysis of the inputs, the fuzzy logic engine normalizes (i.e. calculates a correction value) and filters (i.e., applies a filter comprising an extrema engine) to the results of the analysis from block 510 (block 516). Then, the example on/off identifier 116 identifies whether a media presentation device (e.g., such as the television 106) is in the on state or the off state during the corresponding periods of time metered with the audience measurement device 108 based on the normalized/filtered final fuzzy logic values (block 518).

Figure 6:
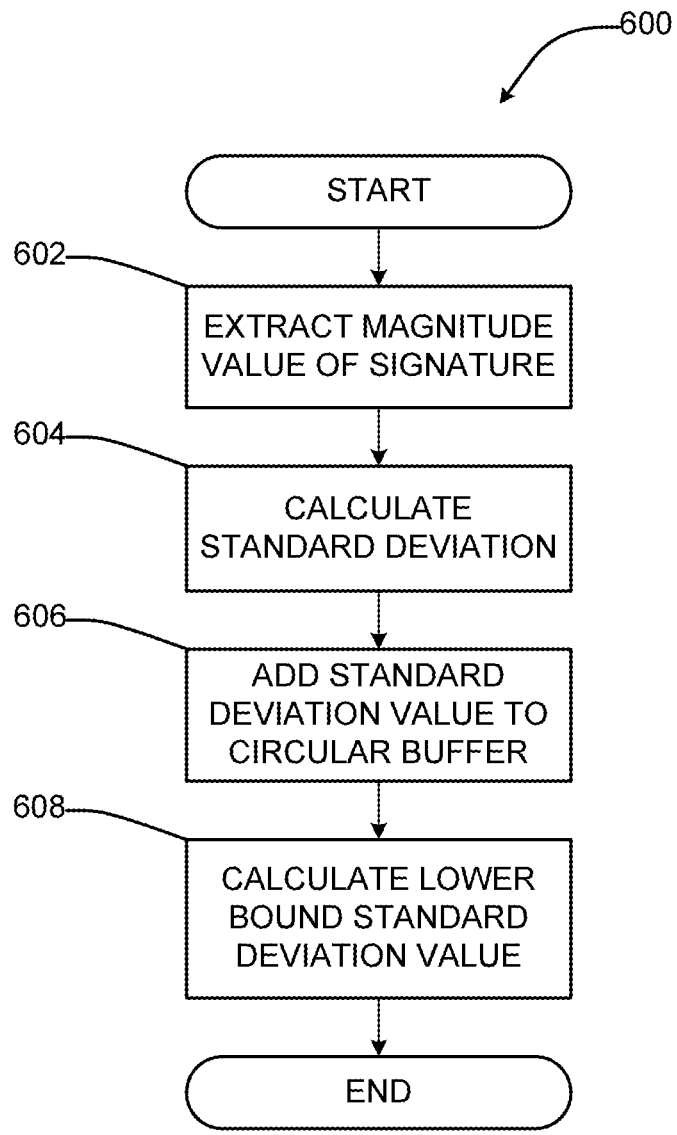
FIG. 6 is a flow diagram representative of example machine readable instructions that may be executed to implement an example standard deviation determiner for inclusion in the example on/off identifier of FIG. 3.

Example machine readable instructions 600 that may be executed to implement the magnitude standard deviation determiner 314 of FIG. 3 and/or used to implement block 512 of FIG. 5 to determine a standard deviation of a magnitude associated with a signature over a specified time period (for brevity hereafter referred to as the standard deviation) are represented by the flowchart shown in FIG. 6. The example machine readable instructions are executed to calculate the standard deviation for each sample period (e.g., 15 seconds) in the time period during which it is desired to determine the on state and/or off state of the media presentation device. While, the example instructions 600 of FIG. 6 are shown to be executed within an on/off identifier (e.g., the example on/off identifier 116) the instructions may be executed anywhere that the data collected via the audience measurement device 108 may be accessed. For example, the example machine readable instructions 600 may be executed within the audience measurement device 108. Furthermore, the example machine readable instructions 600 may be executed at periodic or aperiodic intervals, based on an occurrence of a predetermined event (e.g., a full or near full memory), etc., or any combination thereof.

The example machine readable instructions 600 of FIG. 6 begin when the magnitude standard deviation determiner 314 determines the magnitude values associated with signature(s) corresponding to a specified time period (e.g., 15 seconds) (block 602). Next, the standard deviation determiner 314 calculates a standard deviation for the magnitude values determined in block 602 (block 604). Any appropriate method(s) of calculating standard deviations and associated characteristics of standard deviations may be used.

Next, the standard deviation determiner 314 determines the lower bound of a set of standard deviation(s) (block 606). In the illustrated example, the standard deviation determiner 314 implements a circular buffer to determine a sliding value of standard deviation values. The current calculated standard deviation overwrites the oldest standard deviation in the circular buffer. The circular buffer may store, for example, 120 elements storing standard deviation values calculated for a 15-second time period (block 608). As each new standard deviation value is added to the buffer, the magnitude standard deviation determiner 314 calculates a new lower bound standard deviation value for the elements within the circular buffer (block 608). Although the magnitude standard deviation determiner 314 of the illustrated example determines a lower bound standard deviation value, any other value associated with a standard deviation (e.g., an upper bound) may alternatively be determined.

Figure 7:
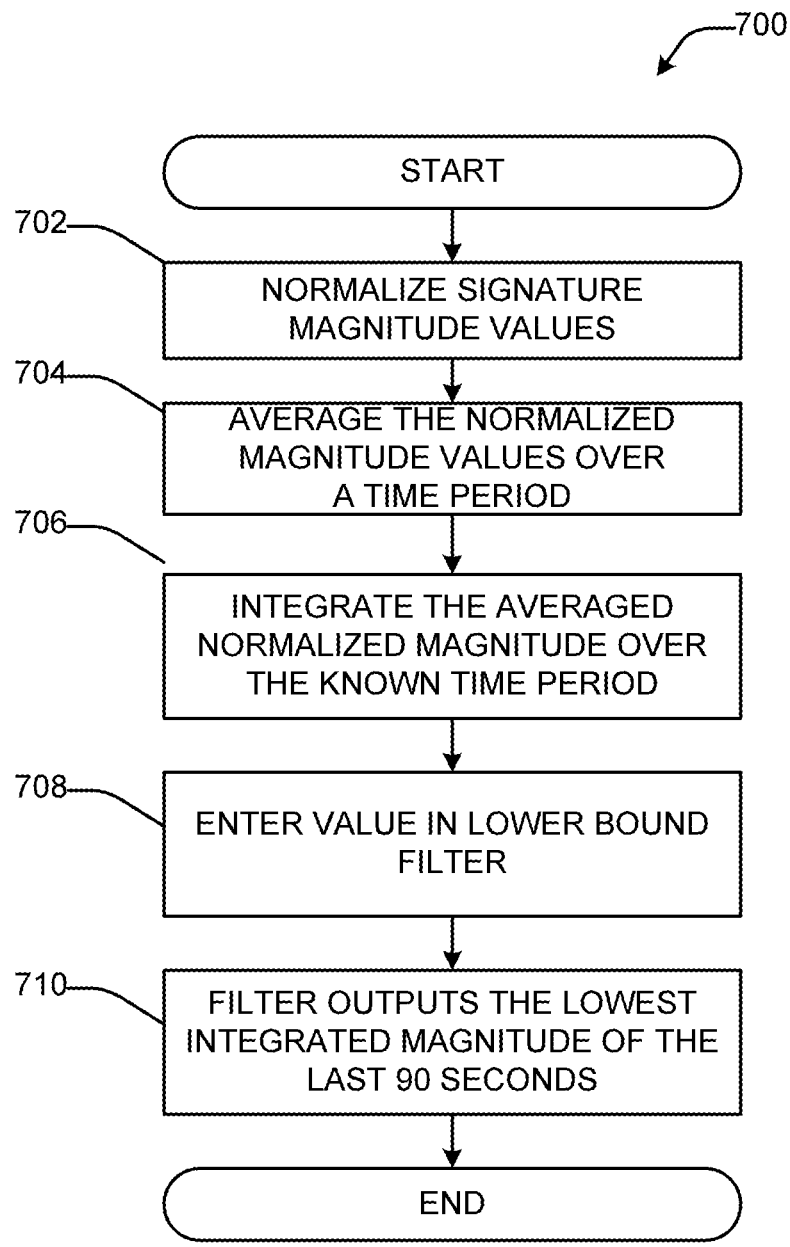
FIG. 7 is a flow diagram representative of example machine readable instructions that may be executed to implement an example integrated magnitude determiner for inclusion in the example on/off identifier of FIG. 3.

Example machine readable instructions 700 that may be executed to implement the integrated magnitude determiner 312 of FIG. 3 and/or used to implement block 510 of FIG. 5 are represented by the flowchart shown in FIG. 7. The example machine readable instructions 700 of FIG. 7 are executed to calculate the integrated magnitude associated with signature(s) corresponding to each sample period (e.g., 7.5 seconds). While the example machine readable instructions 700 are shown to be executed within the example on/off identifier 116, the instructions may be executed anywhere that data collected via the audience measurement device 108 may be accessed. For example, the example machine readable instructions 700 may be executed within the audience measurement device 108. Furthermore, the example machine readable instructions 600 may be executed at periodic or aperiodic intervals, based on an occurrence of a predetermined event (e.g., a full or near full memory), etc., or any combination thereof.

The example machine readable instructions 700 of FIG. 7 begin by causing the integrated magnitude determiner 312 to normalize the magnitude values of the signature(s) taken within the sample time period (e.g., 7.5 seconds) (block 702). A normalized magnitude is calculated by the integrated magnitude determiner 312 for each magnitude value associated with the sample period by adding a correction value to each magnitude value. The correction value may be a constant or a result of an equation based on factors associated with an example implementation. For example, a correction factor may be determined to be the gain of the microphone used to collect the signature at the collection time divided by 5 based on characteristics of the microphone. Next, the integrated magnitude determiner 312 averages the normalized magnitude data values calculated over the sample time period (e.g., 2 seconds) (block 704). The integrated magnitude determiner 312 then integrates the normalized magnitude values over a sample period (e.g., approximately 7.5 seconds) (block 706). An example integration calculation is given by the following equation: SUM (M*$\Delta$T)/T, where M is the average normalized magnitude, $\Delta$T is the time between the magnitude data values summed within the time period and T is the time period of the sample. The integrated magnitude determiner inserts the result of the integration calculation into a filter (e.g., a lower bound filter) (block 708). In the illustrated example, a lower bound filter within the integrated magnitude determiner 312 identifies the lowest value of a buffer containing the value to be used as the integrated magnitude of the signature. In the example implementation, a circular buffer of 12 elements is sampled, with each element containing an integrated magnitude over the corresponding time period (e.g., 7.5 seconds). Thus, the integrated magnitude determiner 312 selects the lowest value in the buffer to yield an output to represent the integrated magnitude of the signature(s) over, for example, the previous 90 seconds (block 710).

Figure 8:
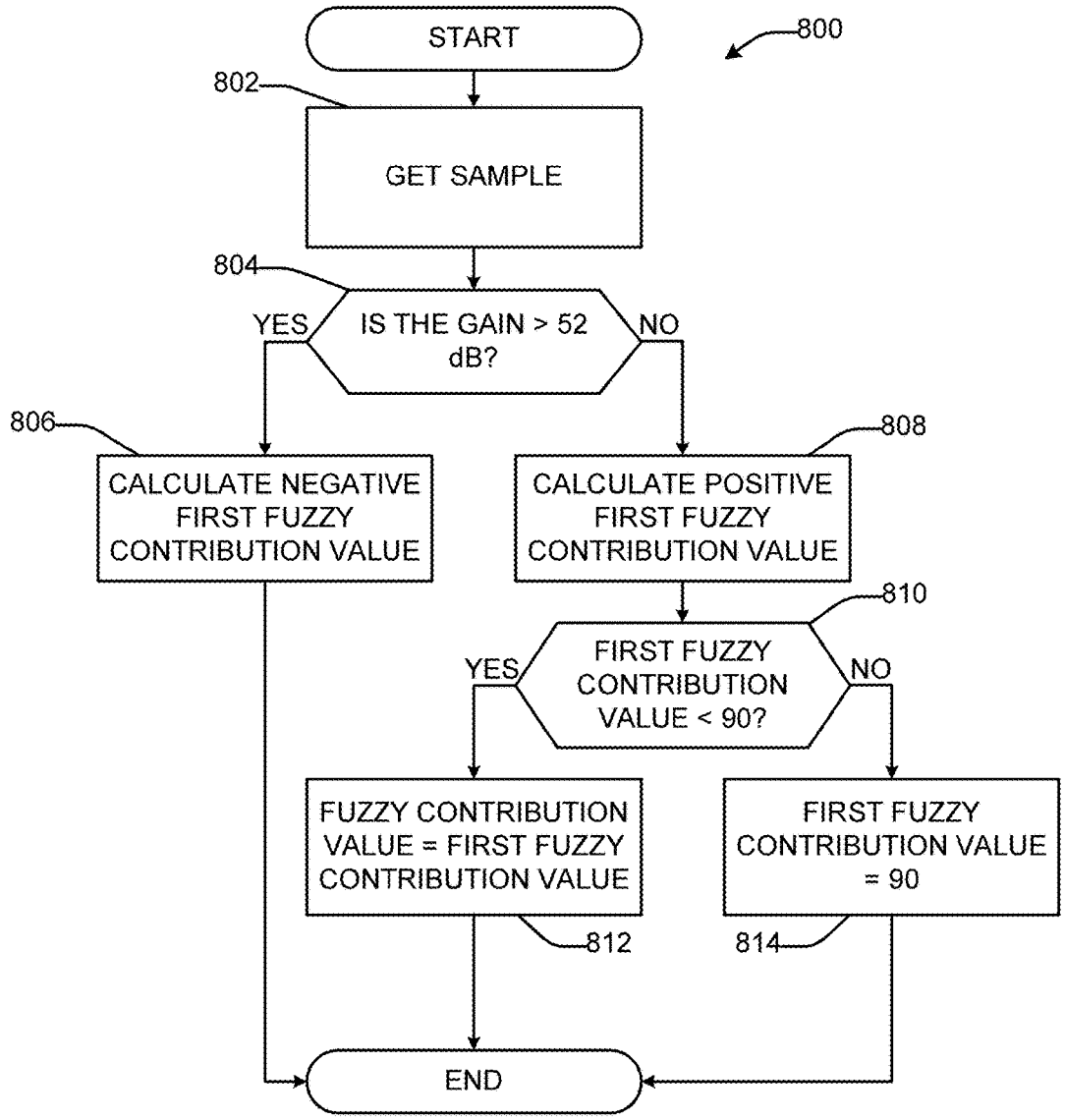
FIG. 8 is a flow diagram representative of example machine readable instructions that may be executed to implement an example gain evaluator for inclusion in the example fuzzy logic engine of FIG. 4A.
Figure 9:
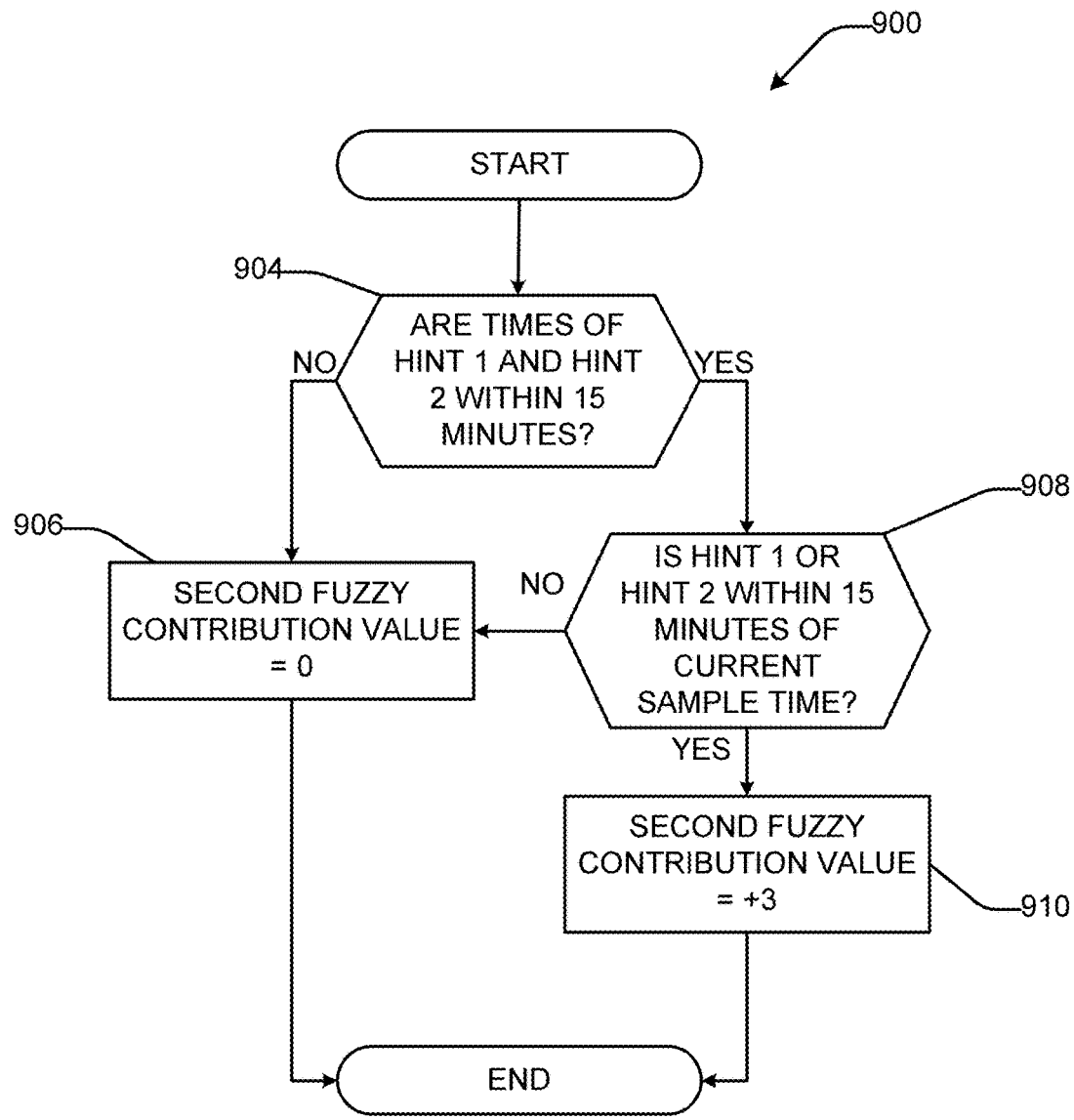
FIG. 9 is a flow diagram representative of example machine readable instructions that may be executed to implement an example remote control hint evaluator for inclusion in the example fuzzy logic engine of FIG. 4A.

Example machine readable instructions 800 that may be executed to implement the gain evaluator 402 of FIG. 4A and/or used to implement, block 504 of FIG. 5 are represented by the flowchart shown in FIG. 8. The flowchart of FIG. 8 also illustrates an example manner of implementing a portion of block 510 of FIG. 5. The example machine readable instructions 800 of FIG. 8 are executed to evaluate the gain applied to the microphone of the example audience measurement device 108 to determine a fuzzy contribution value (e.g., a positive or negative value that corresponds to an on state or an off state) and an audio test score value (e.g., a variable that reflects when the analysis corresponds to an on state). While, the example machine readable instructions 800 are shown to be executed within the example on/off identifier 116 of the back office 114, the instructions may be executed anywhere that data collected via the audience measurement device 108 may be accessed. For example, the example machine readable instructions 800 may also be executed within the audience measurement device 108. Furthermore, the example machine readable instructions 800 may be executed at periodic or aperiodic intervals, based on an occurrence of a predetermined event (e.g., a full or near full memory), etc., or any combination thereof.

The example machine readable instructions 800 operate on the audio gain data that was collected by the microphone gain collector 302 at block 502 of FIG. 5. The gain evaluator 402 then samples the audio gain of the audience measurement device, for example, every 2 seconds (block 802). Next, the gain evaluator 402 analyzes a first sample of the gain to determine whether the gain sample is greater than or equal to a specified gain level (e.g., 52 dB) (block 804). If the gain evaluator 402 determines that the sampled gain is greater than or equal to the specified gain level (e.g., 52 dB), the gain evaluator 402 calculates a negative first fuzzy contribution value (block 806). For example, the first fuzzy contribution value associated with a gain greater than or equal to 52 dB may be calculated by the following equation: fuzzy contribution=(52−Gain)*10.

If the sampled gain is less than the specified gain level (e.g., 52 dB) (block 804), the gain evaluator 402 calculates a positive first fuzzy contribution value (block 808). For example, the first fuzzy contribution value associated with a gain less than 52 dB may be calculated by the following equation in the gain evaluator 402: fuzzy contribution=(52−Gain)*5. For positive fuzzy contribution values, the gain evaluator 402 further analyzes the first fuzzy contribution value to determine whether the calculated first fuzzy contribution value is less than a specified limit (e.g., a limit of 90) (block 810). For example, if the value is less than the limit (block 810), then the fuzzy contribution value is set to the first fuzzy contribution value (block 812). However, if the first calculated fuzzy contribution value is greater than the limit (block 810), then the gain evaluator 402 sets the fuzzy contribution value to a maximum limit (block 814). The positive first fuzzy contribution value is limited by the gain evaluator 402 in this manner to reduce the influence of a gain corresponding to audio inputs not associated with an audio output signal from a media device. For example, the audio gain may be low and yield a positive contribution value due to the example household members 110 talking within the monitored area 120 even if the monitored media device is off. In this manner, the example machine readable instructions 800 operate to bias first fuzzy contribution values indicative of an off state to have a greater contribution than first fuzzy contribution values indicative of an on state Example machine readable instructions 900 that may be executed to implement the remote control hint evaluator 404 of FIG. 4A and/or used to implement block 506 of FIG. 5 are represented by the flowchart shown in FIG. 9. The example machine readable instructions 900 are executed to evaluate remote control hints corresponding to events generated from the remote control 112 to determine whether a display is in an on state or an off state. In particular, the example machine readable instructions 900 are used to determine a fuzzy contribution value (e.g., a positive or negative value that corresponds to an on state or an off state) and an audio test score value (e.g., a variable that reflects when the analysis corresponds to an on state). While, the example machine readable instructions 900 may be executed within the example on/off identifier 116 of the back office 115, the instructions may be executed anywhere that data collected via the audience measurement device 108 may be accessed. For example, the example machine readable instructions 900 may be executed within the audience measurement device 108. The example machine readable instructions 900 may be executed at periodic or aperiodic intervals, based on an occurrence of a predetermined event (e.g., a full or near full memory), etc., or any combination thereof.

The example machine readable instructions 900 operate within the example remote control hint evaluator 404 upon a series of remote control hints (e.g., a series of commands entered via the remote control device 112) captured within a specified time period (e.g., thirty minutes) and are sampled around specified time intervals. For example, the hints may comprise a series of hints fifteen minutes before and after the current sample time and taken at 2-second intervals. The instructions of FIG. 9 begin when the hints sampled within a time frame at issue are compared by the remote control hint evaluator to determine whether two hints occur within a specified time (e.g., 15 minutes) of each other (block 704). For example, a first hint that occurs within twelve minutes of a second hint would satisfy this criterion. If two hints do not occur within the specified time, the remote control hint evaluator 404 determines that the hints are not helpful in determining the on state or the off state of the media presentation device and, therefore, the second fuzzy contribution value is assigned a value of zero (block 906).

If, to the contrary, the comparison at block 704 determines that two hints occurred within the specified time (e.g., 15 minutes) of one another, then the remote control hint evaluator 404 compares the hints to determine whether the hints occur within the specified time of the current sample times being examined (block 908). For example, if the remote control hint evaluator determines that (1) two hints occur within fifteen minutes of each other (block 904), (2) the first hint is within 15 minutes of the current sample time, but (3) the second hint occurs 18 minutes before the current time (block 908), then control advances to block 906 and the hints do not contribute to the fuzzy logic analysis. However, if the two hints occur within fifteen minutes of the current time (block 908), then control advances to block 910. The hints are assigned a second fuzzy contribution value of +3 (block 910).

Figure 10:
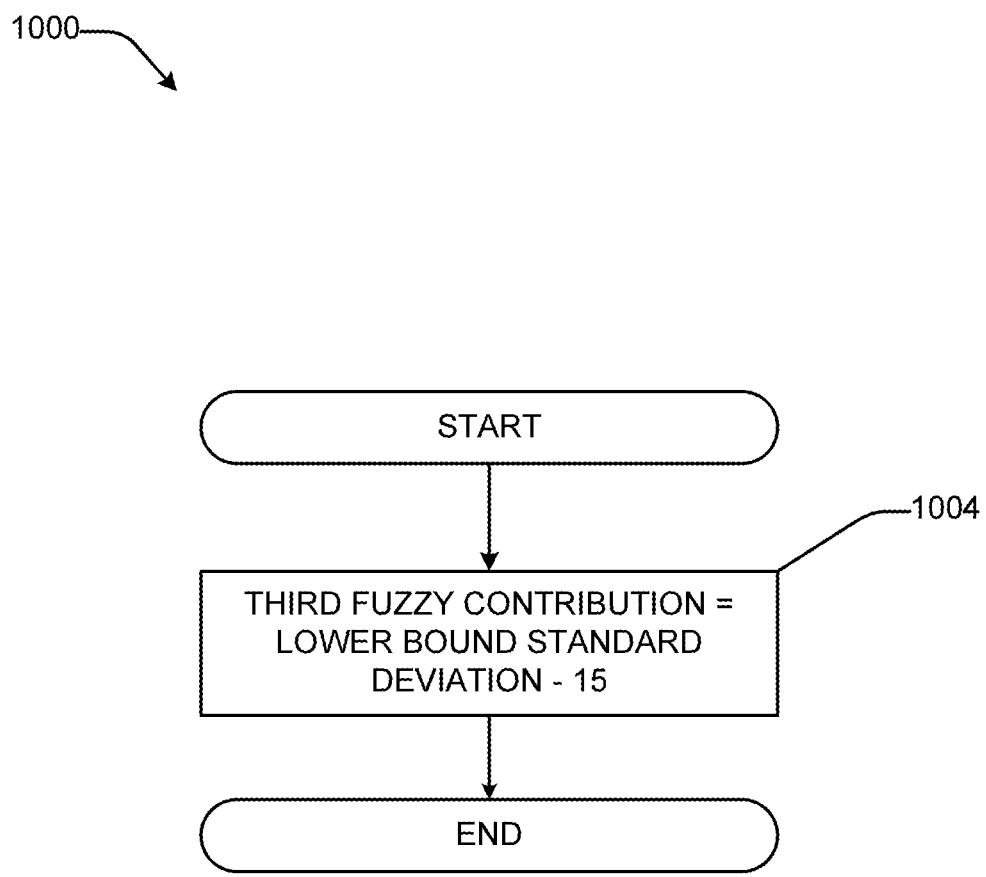
FIG. 10 is a flow diagram representative of example machine readable instructions that may be executed to implement an example magnitude standard deviation evaluator for inclusion in the example fuzzy logic engine of FIG. 4A.

Example machine readable instructions 1000 that may be executed to implement the standard deviation evaluator 406 of FIG. 4A and/or used to implement, block 514 of FIG. 5 are represented by the flowchart shown in FIG. 10. The example machine readable instructions 1000 are used to determine the third fuzzy contribution value (e.g., a positive or negative value that corresponds to an on state or an off state). While, the example machine readable instructions 1000 may be executed within the example on/off identifier 116, the instructions may be implemented anywhere that data collected via the audience measurement device 108 may be accessed. For example, the example machine readable instructions 1000 may also be executed within the audience measurement device 108. Furthermore, the example machine readable instructions 1000 may be executed at periodic or aperiodic intervals, based on an occurrence of a predetermined event (e.g., a full or near full memory), etc., or any combination thereof.

The example machine readable instructions 1000 evaluate a lower bound standard deviation (LBSD) output from the magnitude standard deviation determiner 314 to determine the third fuzzy contribution value to be assigned to the LBSD output (block 1004). In particular, the standard deviation determiner calculates the third fuzzy contribution value by evaluating a function associated with the LBSD, and example being an example function may subtract a constant from the LBSD, where the constant value and/or function utilized in the calculation is implementation specific and varies depending on the application. For example, experimental results have shown that LBSD values less than 10 corresponded to an off state of the television 106 and the television on state corresponded to LBSD values within the range of 10 to 20. For example, an example constant of 15, representing a threshold to determine an on state indication. The following equation is used in the illustrated example to calculate the third fuzzy contribution value: third fuzzy contribution=LBSD-15. In this manner, the example machine readable instructions 1000 operate to bias third fuzzy contribution values indicative of an off state to have a greater contribution than third fuzzy contribution values indicative of an on state Example machine readable instructions 1100 that may be executed to implement the integrated magnitude evaluator 408 of FIG. 4A and/or used to implement block 510 of FIG. 5 are represented by the flowchart shown in FIG. 11. The example machine readable instructions 1100 evaluate the integrated magnitude determined by the example integrated magnitude determiner 312 to determine whether a monitored device is in an on state or an off state. Further, the example machine readable instructions 1100 are used to determine a fuzzy contribution value (e.g., a positive or negative value that corresponds to an on state or an off state) While the example machine readable instructions 1100 are shown to be executed within the example on/off identifier 116, the instructions may be executed anywhere that data collected via the audience measurement device 108 may be accessed. For example, the example machine readable instructions 1100 may be executed within the audience measurement device 108. Furthermore, the example machine readable instructions 1100 may be executed at periodic or aperiodic intervals, based on an occurrence of a predetermined event (e.g., a full or near full memory), etc., or any combination thereof.

Figure 11:
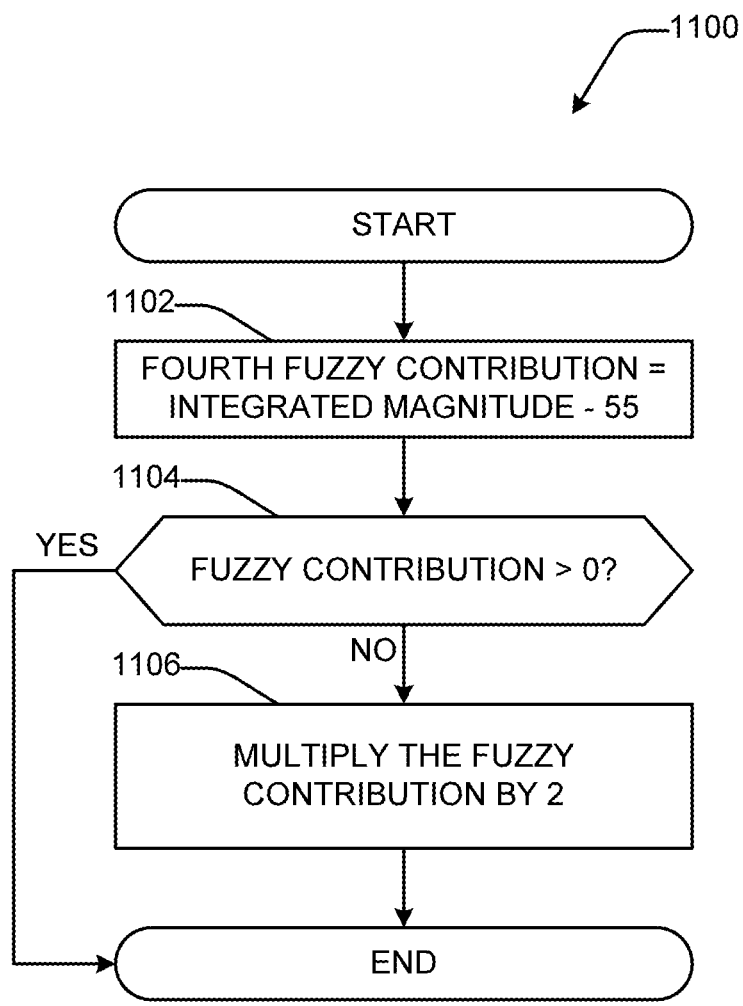
FIG. 11 is a flow diagram representative of example machine readable instructions that may be executed to implement an example integrated magnitude evaluator for inclusion in the example fuzzy logic engine of FIG. 4A.

The example machine readable instructions 1100 of FIG. 11 begin by causing the integrated magnitude evaluator 408 to assign a value to the fourth fuzzy contribution value by evaluating an equation corresponding to the integrated magnitude value, for example, subtracting a constant value from the integrated magnitude value (e.g., an integrated magnitude-55) (block 1102). The constant value and/or function utilized in the calculation of the integrated magnitude value is implementation specific and varies depending on the application. The example constant represents a threshold value of the integrated magnitude corresponding with the lowest end of a range of experimentally determined values that indicate an on state of a media presentation device. For example, experimental results from an example implementation depicted in FIG. 18 demonstrate that an on state corresponds with integrated magnitude values in a range between +55 and +95 and an off state corresponds with integrated magnitude values in the range between -21 and +22). In the illustrated example, the constant is 55 and the fourth fuzzy contribution value is set in accordance with the following example equation: fourth fuzzy contribution value=integrated magnitude-55. The integrated magnitude evaluator 408 then examines the fourth fuzzy contribution value to determine whether it has positive or negative value (block 1104). If the fourth fuzzy contribution value is a negative number (block 1104), then the integrated magnitude evaluator 408 multiplies the fourth fuzzy contribution value by two (block 1106). If the fourth fuzzy contribution value is positive (block 1104), then the fourth integrated magnitude evaluator 408 does not change the fuzzy contribution value calculated at block 1102 and the instructions of FIG. 11 terminate. In this manner, the example machine readable instructions 1100 operate to bias fourth fuzzy contribution values indicative of an off state to have a greater contribution than fourth fuzzy contribution values indicative of an on state.

Figure 12A:
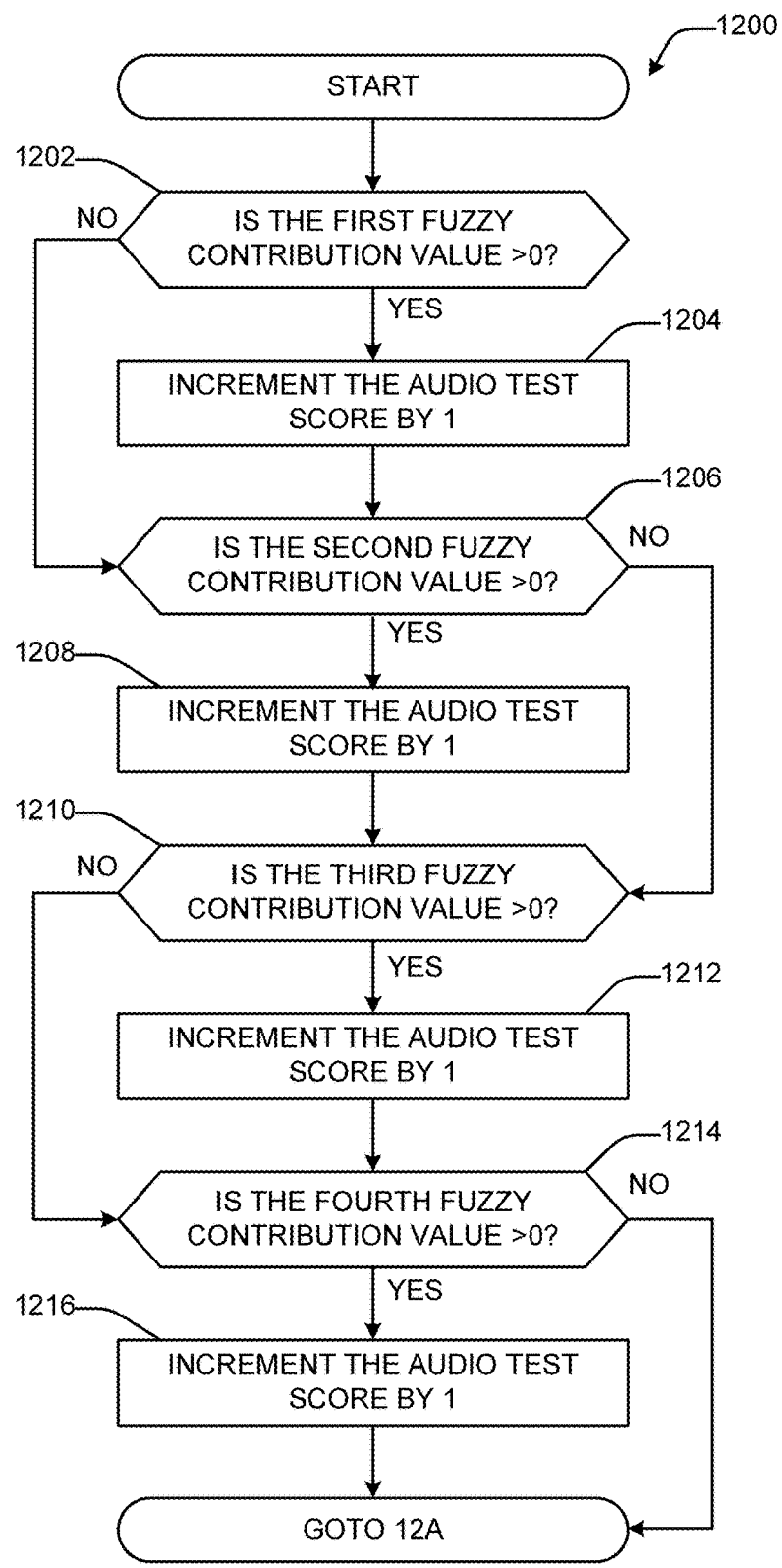
FIGS. 12A and 12B are collectively flow diagrams representative of example machine readable instructions that may be executed to implement an example input convergence evaluator for inclusion in the example fuzzy logic engine of FIG. 4A.
Figure 12B:
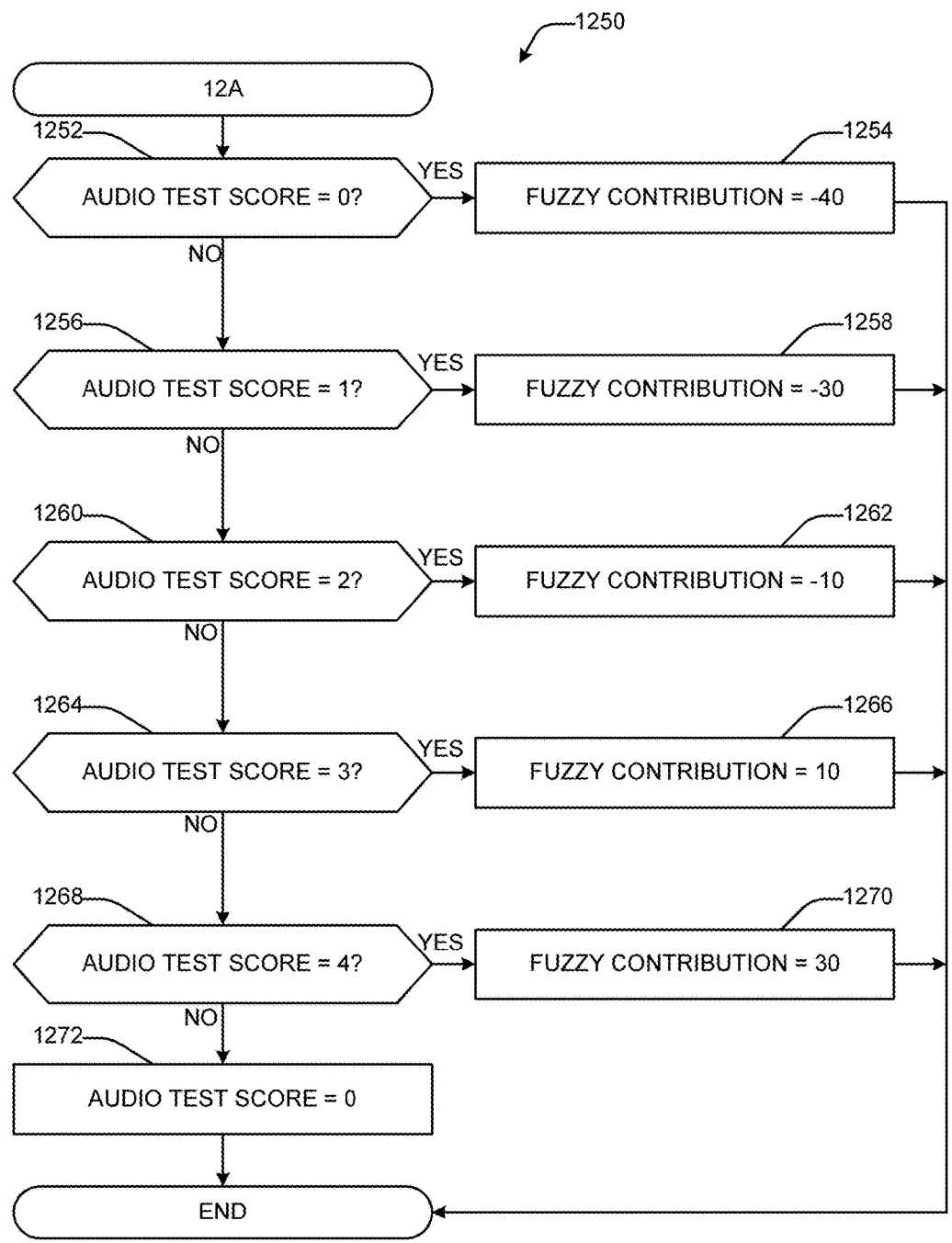

Example machine readable instructions 1200 and 1250 that may be executed to implement the example input convergence evaluator 410 of FIG. 4A and/or used to implement block 514 of FIG. 5 are represented by the flowcharts shown in FIGS. 12A-12B. The example machine readable instructions 1200 of FIG. 12A evaluate the number of fuzzy inputs (e.g., fuzzy inputs corresponding to a gain applied to a microphone, remote control hints, an integrated magnitude of a signature over a period of time, a standard deviation value of a signature over a period of time, etc.) having a positive fuzzy contribution value to calculate an audio test score value. Further, the example machine readable instructions 1250 of FIG. 12B determine a fifth fuzzy contribution value (e.g., a positive or negative value that corresponds to an on state or an off state) based on the audio test score value. While, the example machine readable instructions 1200 and 1250 may be executed within the example on/off identifier 116, the instructions may be executed anywhere that data collected via the audience measurement device 108 may be accessed. For example, the example machine readable instructions 1200 and 1250 may also be executed within the audience measurement device 108. Furthermore, the example machine readable instructions 1200 and 1250 may be executed at periodic or aperiodic intervals, based on an occurrence of a predetermined event (e.g., a full or near full memory), etc., or any combination thereof.

The example machine readable instructions 1200 begin when the input convergence evaluator 410 determines if the first fuzzy contribution value output by the gain evaluator 402 is a value greater than zero (block 1202). If the first fuzzy contribution value is a positive number (block 1202), the output of the gain evaluator 402 indicates that the monitored media presentation device is in the on state and the audio test score value is incremented by one (block 1204). If the first fuzzy contribution value is determined to be a negative number (block 1202), the output of the gain evaluator 402 indicates that the monitored media presentation device is in the off state and the audio test score value is not incremented by the input convergence evaluator 410.

Next, the input convergence evaluator 410 evaluates, irrespective of whether control reached block 1206 via block 1204 or directly from block 1202, the second fuzzy contribution value output by the remote control hint evaluator 404 to determine whether the second fuzzy contribution value is greater than zero (block 1206). If the second fuzzy contribution value is a positive number (block 1206), the output of the remote control hint evaluator 404 indicates that the monitored media presentation device is in the on state and an audio test score value is incremented by one (block 1208). Control then advances to block 1210. If the second fuzzy contribution value is determined to be a negative number (block 1206), the output of the remote control hint evaluator 404 indicates that the monitored media presentation device is in the off state and the audio test score value is not incremented by the input convergence evaluator 410. Control then advances to block 1210.

Irrespective of whether control reached block 1210 via block 1208 or directly from block 1206, the input convergence evaluator 410 then evaluates the third fuzzy contribution value output by the standard deviation evaluator 406 to determine whether the third fuzzy contribution value is greater than zero (block 1210). If the third fuzzy contribution value is a positive number (block 1210), the output of standard deviation evaluator 406 indicates that the monitored media device is in the on state and an audio test score value is incremented by one (block 1212). Control then advances to block 1214. If the third fuzzy contribution value is determined to be a negative number (block 1210), the output of the standard deviation evaluator 406 indicates that the monitored media device is in the off state and the audio test score value is not incremented by the input convergence evaluator 410. Control then advances to block 1214.

Irrespective of whether control reached block 1214 via block 1212 or directly from block 1210, the input convergence evaluator 410 evaluates the fourth fuzzy contribution value output by the integrated magnitude evaluator 408 to determine whether the fourth fuzzy contribution value is greater than zero (block 1214). If the fourth fuzzy contribution value is a positive number (block 1214), the output of integrated magnitude evaluator 408 indicates that the monitored media device is in the on state and an audio test score value is incremented by one (block 1216). Control then advances to block 1252 of FIG. 12B. If the fourth fuzzy contribution value is determined to be a negative number (block 1214), the output of the integrated magnitude evaluator 408 indicates that the monitored media device is in the off state and the audio test score value is not incremented by the input convergence evaluator. Control then advances to block 1252 of FIG. 12B.

Turning to block 1252 of FIG. 12B, the input convergence evaluator 410 evaluates the audio test score to assign a value to a fifth fuzzy contribution. In the illustrated example, starting at block 1252, the input convergence evaluator 410 evaluates the audio test score to determine if the value is zero (block 1252). The audio test score will be zero if no input evaluators (e.g., the gain evaluator 402, the remote control hint evaluator 404, the standard deviation evaluator 406 and the integrated magnitude evaluator 408) indicated the on state. If the audio test score is zero (block 1252), then the fifth fuzzy contribution value for the input convergence evaluator 410 is assigned a value of −40 by the input convergence evaluator 410 (block 1254). The instructions of FIG. 12B then terminate. If the audio test score is not zero (block 1252), the input convergence evaluator 410 evaluates the audio test score to determine if the audio test score is one (block 1256), the audio test score equals one if only one of the input evaluators indicates the media presentation device is in the on state (block 1256). If the audio test score has a value of one (block 1256), then the input convergence evaluator 410 assigns a value of −30 to the fifth fuzzy contribution value (block 1258). The instructions of FIG. 12B then terminate.

If the audio test score is not one (block 1256), the input convergence evaluator 410 evaluates the audio test score to determine if the value is two (block 1260). The audio test score equals two if only two of the input evaluators indicate the media presentation device is in the on state (block 1260). If the audio test score has a value of two, then the fifth fuzzy contribution value for the input convergence evaluator 410 is assigned a value of −10 (block 1262). The instructions of FIG. 12B then terminate.

If the audio test score is not two (block 1260), the input convergence evaluator 410 evaluates the audio test score to determine if the value is three (block 1264). The audio test score equals three if only three of the input evaluators indicate the media presentation device is in the on state (block 1264). If the audio test score has a value of three, then the fifth fuzzy contribution value for the input convergence evaluator 410 is assigned a value of +10 (block 1266). The instructions of FIG. 12B then terminate.

If the audio test score is not three (block 1264), the input convergence evaluator 410 evaluates the audio test score to determine if the value is four (block 1268). The audio test score equals four if four of the input evaluators indicate the media presentation device is in the on state (block 1268). If the audio test score has a value of four, then the fifth fuzzy contribution value for the input convergence evaluator 410 is assigned a value of +30 (block 1270). The instructions of FIG. 12B then terminate. However, if the audio test score is not four (block 1268), the audio test score has a value outside the expected range (e.g., 0 through 4) and, therefore the audio test score is reset to 0 (block 1272). The instructions of FIG. 12B then terminate.

In the illustrated example, the fifth fuzzy contribution is a value assigned a value of −40, −30, −10, 10 or 30 depending on the value of the audio test score. Such assignment values are illustrative examples and are not meant to be limiting. For example, other assignment values may be used depending on the range of possible values of the audio test score, different biases desired to be introduced to the fifth fuzzy contribution value, etc.

Figure 13:
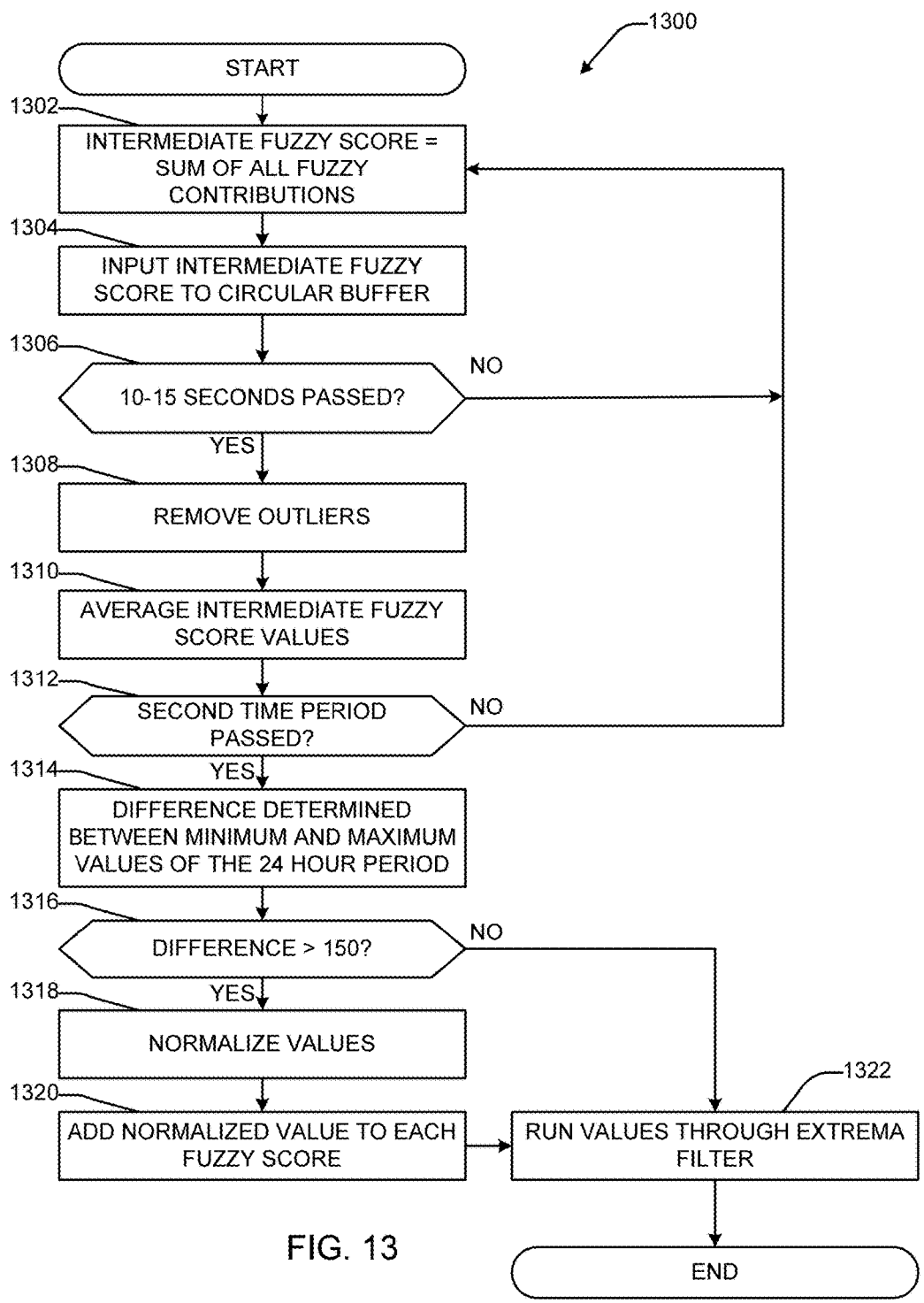
FIG. 13 is a flow diagram representative of example machine readable instructions that may be executed to implement an example stage one fuzzy logic evaluator for inclusion in the example fuzzy logic engine of FIG. 4A.

Example machine readable instructions 1300 that may be executed to implement the fuzzy contribution analyzer 412 of FIG. 4A and/or used to implement the processing at block 516 of FIG. 5 are represented by the flowchart shown in FIG. 13. The example machine readable instructions 1300 are executed to analyze the fuzzy contributions provided by the above-mentioned evaluators (e.g., the gain evaluator 402, the remote control hint evaluator 404, the standard deviation evaluator 406, integrated magnitude evaluator 408 and the input convergence evaluator 410). Further, the example machine readable instructions 1300 are used to determine a sum (e.g., an intermediate fuzzy score) of all the fuzzy contribution values from the above-mentioned input evaluators. While the example machine readable instructions 1300 may be executed within an on/off identifier (e.g., the example on/off identifier 116), a fuzzy logic engine (e.g., the fuzzy logic engine 316) and/or within an analyzer (e.g., the fuzzy contribution analyzer 412), the instructions may also be executed anywhere data collected via the audience measurement device 108 may be accessed. For example, the example machine readable instructions 1300 may also be implemented within the audience measurement device 108. Furthermore, the example machine readable instructions 1300 may be executed at periodic or aperiodic intervals, based on an occurrence of a predetermined event (e.g., a full or near full memory), etc., or any combination thereof.

The example machine readable instructions 1300 begin, for example, when the fuzzy contribution analyzer 412 sums the fuzzy contribution values provided by each of the example evaluators (e.g., the gain evaluator, the remote control hint evaluator 404, the standard deviation evaluator 406 and the integrated magnitude evaluator 408) at the end of each processing cycle (e.g., every engine cycle of two seconds) of the fuzzy logic engine 316 and stores the sum as an intermediate fuzzy score (block 1302). The fuzzy contribution analyzer 412 places the intermediate fuzzy score in a first-in, first-out (FIFO) circular buffer of, for example, 30 elements which represents data evaluated over a specified time period (e.g., 30 engine cycles), where each element corresponds to one engine cycle (e.g., two seconds) (block 1304). The fuzzy contribution analyzer 412 then determines via a timer or counter whether a first specified time period has passed (e.g., 10-15 seconds) (block 1306). If the first time period has not passed (block 1306), the fuzzy contribution analyzer 412 determines the intermediate fuzzy score for the next engine cycle (block 1302). When the first specified time period has passed (block 1306), the fuzzy contribution analyzer 412 examines the entries in the example circular buffer using any outlier removal method (e.g., the example method 1500 of FIG. 15) to remove values that lie outside a specified range for valid data (e.g., between a $25^{th}$ percentile and a $75^{th}$ percentile (block 1308). The fuzzy contribution analyzer 412 then averages the remaining values in the circular buffer and stores the average as the final fuzzy score for the first time period (block 1310).

Once the final fuzzy score value is determined (block 1310), the fuzzy contribution analyzer 412 determines whether data corresponding to a second specified time period has been collected (e.g., data corresponding to a twenty-four hour period) (block 1312). If not, control returns to block 1302. If, however, the specified time period has elapsed (block 1312), the fuzzy contribution analyzer 412 examines the final fuzzy score values collected during the second specified time period and determines the difference between the minimum and maximum values for the second specified time period (block 1314). The difference between the minimum and maximum final fuzzy score values for the specified time period are examined to determine whether the difference is greater than a maximum threshold value (e.g., a value of 150) (block 1316). If the value is less than the threshold (1316), then the final fuzzy score values of the hour time period are filtered (e.g., using an example extrema filter) (block 1322). Returning to block 1316, if the determined difference between the minimum and maximum final fuzzy score values during the second time period is greater than the threshold value (block 1316), then the fuzzy contribution analyzer 412 determines a normalization factor (block 1318). In the illustrated example, the normalization factor is determined using the following equation:

normalization factor=((((maximum value−minimum value)÷2)−maximum value)÷2).

After the normalization factor is computed (block 1318), the fuzzy contribution analyzer 412 adds the normalization factor to each final fuzzy score value within the time period (block 1320). The fuzzy contribution analyzer 412 then filters the normalized fuzzy score values of the time period (e.g., using an example extrema filter) (block 1322). An example extrema filter may be implemented within the fuzzy contribution analyzer by determining a maximum final fuzzy score value for a specified number of entries (e.g., thirty entries) and then setting the value for each of the examined entries to the determined maximum value.

Figure 14A:
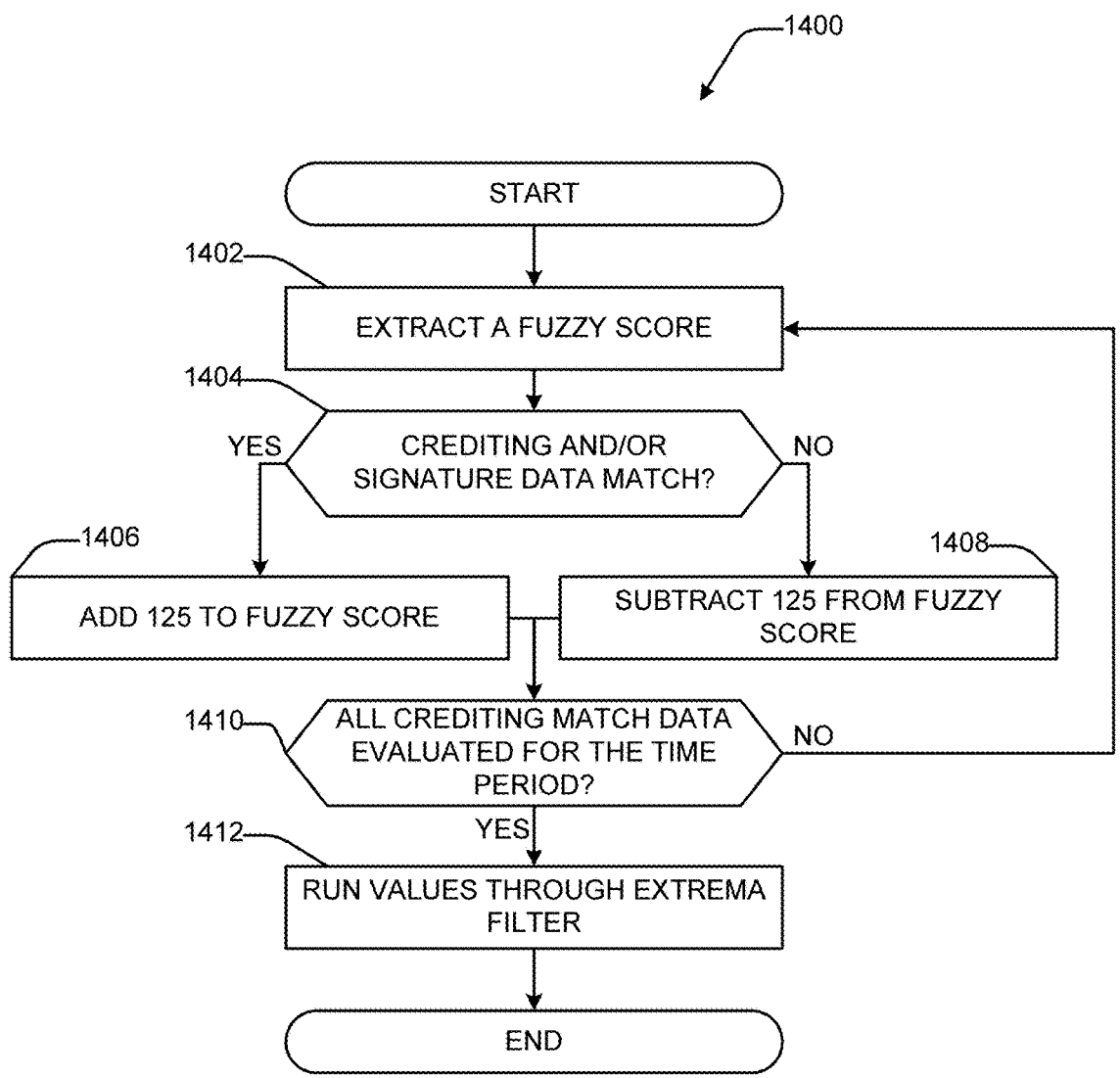
FIGS. 14A and 14B are flow diagrams representative of example machine readable instructions that may be executed to implement an example stage two fuzzy logic evaluator for inclusion in the example fuzzy logic engine of FIG. 4A.
Figure 14B:
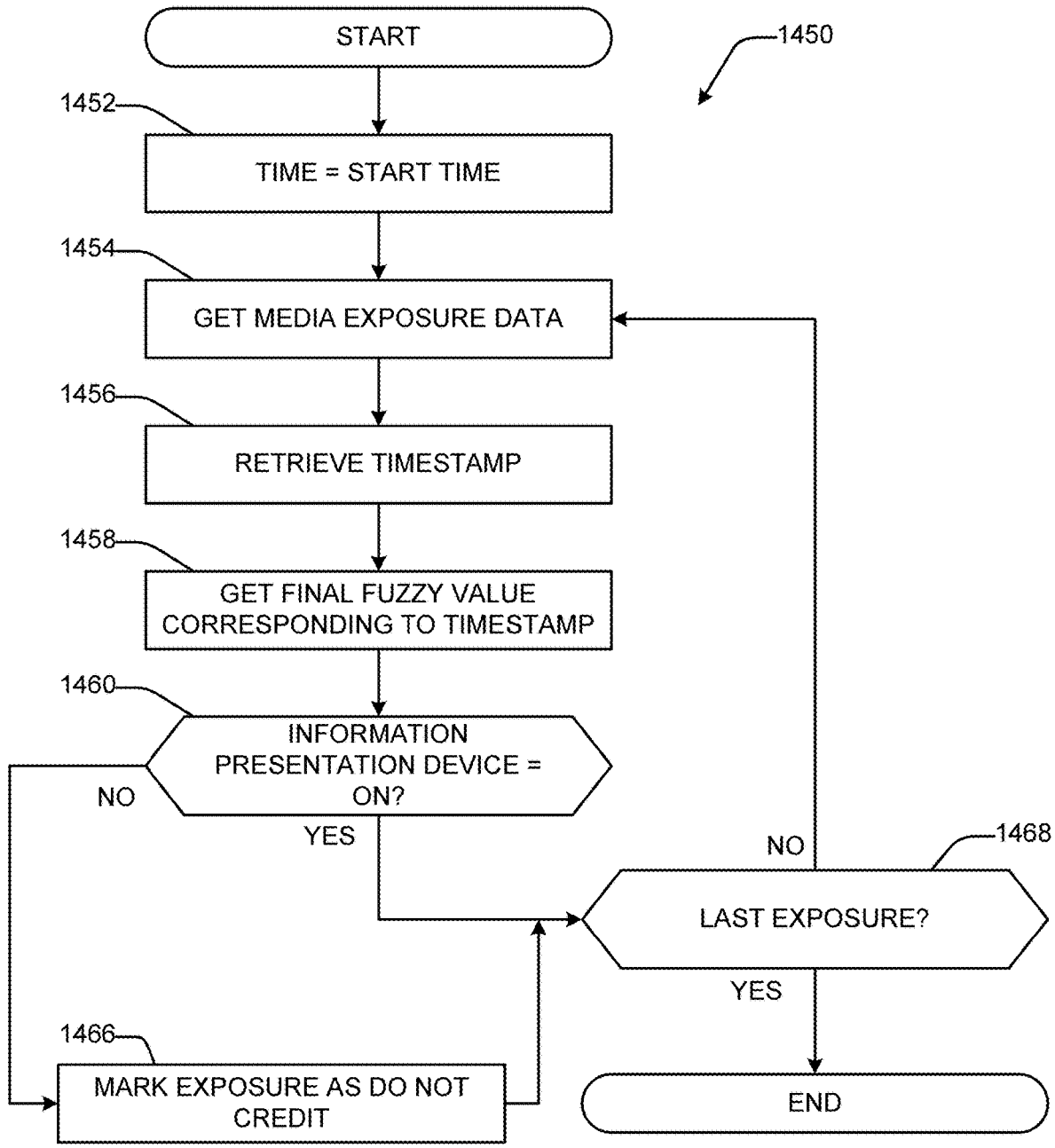

Example machine readable instructions 1400 and 1450 that may be executed to implement the crediting contribution analyzer 414 of FIG. 4A and/or used to implement block 518 of FIG. 5 are represented by the flowcharts shown in FIGS. 14A and 14B. As shown by the example machine readable instructions 1400 and 1450 of FIGS. 14A and 14B, the crediting contribution analyzer 414 analyzes the final fuzzy score values determined by the fuzzy contribution analyzer 412 to determine whether a media device was in an on state or an off state within a specified time period and, thus, to determine whether media detected during the time period should be credited as media exposure. While, the example machine readable instructions 1400 may be executed within the example on/off identifier 116, the instructions may be executed anywhere data collected via the audience measurement device 108 may be accessed. For example, the example machine readable instructions 1400 may also be implemented within the audience measurement device 108. Furthermore, the example machine readable instructions 1400 may be executed at periodic or aperiodic intervals, based on an occurrence of a predetermined event (e.g., a full or near full memory), etc., or any combination thereof.

The example machine readable instructions 1400 begin when the crediting contribution analyzer 414 extracts final fuzzy score values corresponding to particular time periods (e.g., 10 or 15 second intervals beginning at a certain specified time) (block 1402). The crediting contribution analyzer 414 then analyzes signature matching data and/or crediting information corresponding to the same example time period to determine whether a match (e.g., a signature match and/or crediting match) was found within the specified time period (block 1404). If the crediting contribution analyzer 414 determines a signature match occurred during the examined time period, each final fuzzy score within the examined time period is adjusted by a specified value (e.g., adding a constant value of +125) (block 1406). Conversely, if a signature match was not determined in the examined time period, each final fuzzy score e within the time period is adjusted by a second specified value (e.g., a constant value of −125) (block 1408). The first and second specified values used to adjust the final fuzzy score may be constant values, as in the illustrated example, and/or determined based on an equation corresponding to the match. The constant value and/or equation utilized by the crediting contribution analyzer 414 to increment the final fuzzy score is implementation specific and varies depending on the application.

Next, the crediting contribution analyzer 414 determines whether all final fuzzy scores have been evaluated (block 1410). If all of the final fuzzy scores have not been evaluated, the crediting contribution analyzer 414 extracts the final fuzzy scores for the next time period to be examined (block 1402). If the crediting contribution analyzer 414 has examined and adjusted all of the final fuzzy scores for the current time period, the adjusted final fuzzy score values are processed by an extrema filter to determine time intervals during which a media presentation device may have been in an on state or an off state (block 1412). For brevity, an interested reader is referred to the example extrema filter discussed above in conjunction with FIG. 13.

Turning to FIG. 14B, the example machine readable instructions 1450 begin when the creditor 416 extracts a timestamp associated with a final fuzzy score value associated with a start time of the specified time period (block 1452). The creditor 416 then collects media exposure information, including both the signature and any crediting match, found for the specified time period within a database in the back office 116 (block 1454). The creditor 418 then reviews the timestamp associated with the collected media exposure (block 1456). Next, the creditor 416 gathers the final fuzzy score value corresponding to the timestamp associated with the crediting information (block 1458).

The timestamps associated with the media exposure and the timestamp associated with the final fuzzy value are then analyzed to determine whether the information presentation device was on at the time specified by the associated timestamps (block 1460). If the creditor 416 determines that the media presentation device was on (block 1460), then the media exposure information is not modified and processing continues until the last of the media exposure data corresponding to the specified time period has been examined (block 1468). Conversely, if the media presentation device was determined to be off by the creditor 416 (block 1460), then the media exposure information associated to the timestamp is marked to indicate that no valid crediting match occurred during the time (block 1466). Once the creditor 416 marks the exposure, the media exposure information is examined to determine whether the last of the media exposure data had been examined (block 1468). If the creditor 416 determines that no more media exposure information remains, the instructions of FIG. 14B terminate. Conversely, if the creditor 418 determines that more media exposure information remains (block 1468), then the instructions return to gather the next media exposure information (block 1454).

Figure 15:
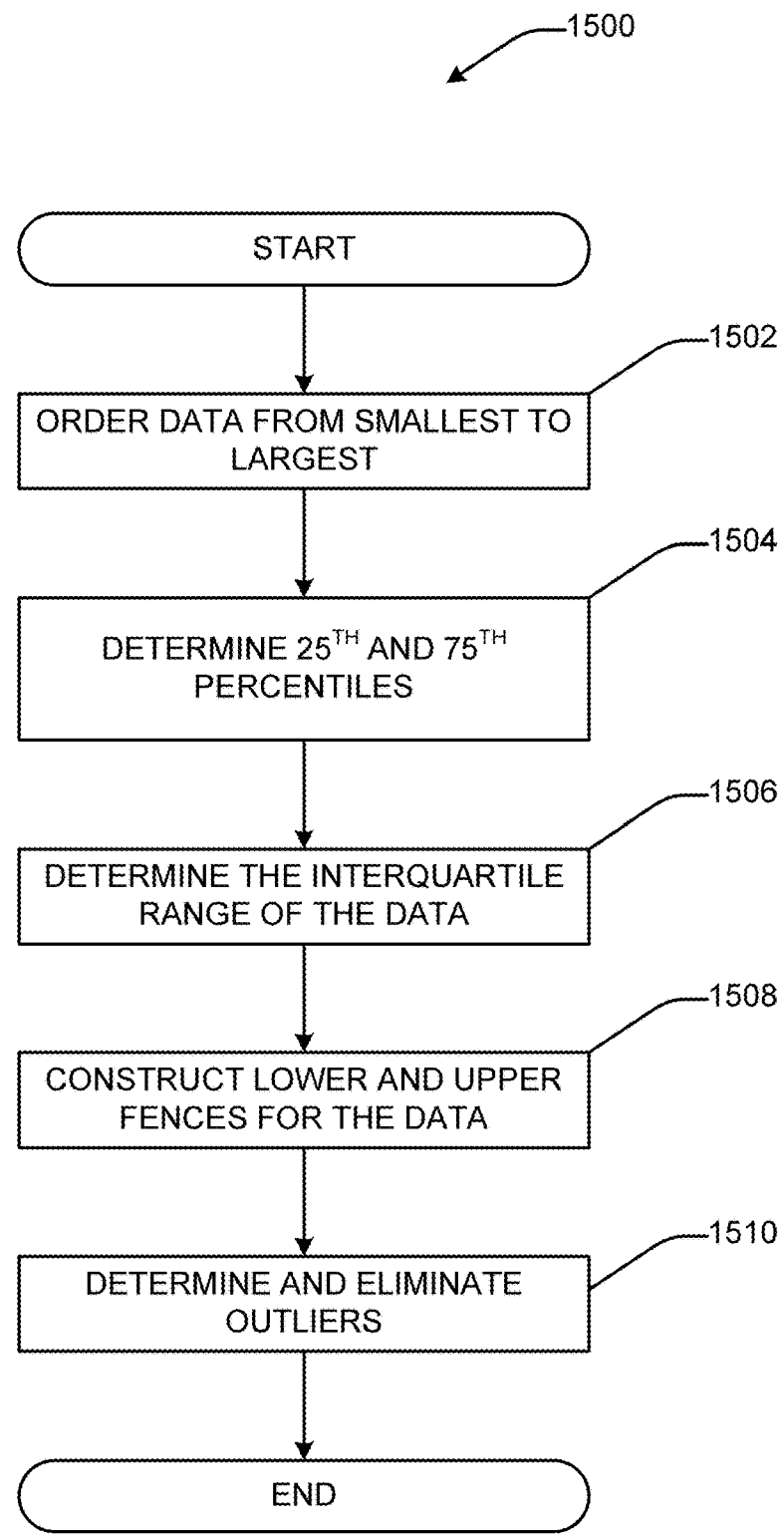
FIG. 15 is a flow diagram representative of example machine readable instructions that may be further executed in conjunction with the example machine readable instructions of FIGS. 13 and 14 to implement an example outlier removal method within the fuzzy logic engine of FIG. 4A.

Example machine readable instructions 1500 that may be executed to identify data points falling outside a specified range of values within an examined time period (e.g., outliers) are represented by the flowchart shown in FIG. 15. The example instructions of FIG. 15 may be used to implement, for example, the fuzzy contribution analyzer 412 and/or block 1308 of FIG. 13. The example machine readable instructions 1500 determine a data point that lies outside a specified range of values of a data set (e.g., outside the range between a first quartile and a third quartile). While, the example machine readable instructions 1500 of FIG. 15 may be executed by the example on/off identifier 116, the instructions may be executed anywhere that data collected via the audience measurement device 108 may be accessed. For example, the example machine readable instructions 1500 may also be implemented within the audience measurement device 108. Furthermore, the example machine readable instructions 1500 may be executed at periodic or aperiodic intervals, based on an occurrence of a predetermined event (e.g., a full or near full memory), etc., or any combination thereof.

The example machine readable instructions 1500 begin by ordering the data within the set to be examined (e.g., the data stored within the buffer as explained in conjunction with the instructions 1300 described above) from the smallest to largest value (e.g., an example of an ordered data set comprising nine entries is: 35, 47, 48, 50, 51, 53, 54, 70, 75) (block 1502). Next, the range containing valid data is determined by calculating indexes associated with the start and end of the valid data range (e.g., calculating an index associated with the $25^{th}$ percentile or first quartile and an index associated with the $75^{th}$ percentile or third quartile of the examined values) (block 1504). A percentile value is determined by multiplying the sample size (e.g., the number of values to be examined) by the percentile to be calculated (e.g., the $25^{th}$ or Q1 value and the $75^{th}$ percentile or Q3 value) (block 1504). Once the fuzzy contribution analyzer 412, for example, determines the percentiles (e.g., the $25^{th}$ and $75^{th}$ percentiles corresponding to the first quartile and third quartiles, respectively) an interquartile range is determined for use in calculating constructing a lower and an upper fence for evaluating the data (block 1506). For example, a $25^{th}$ percentile for a series of nine numbers may be calculated by the following: 9*0.25=2.25. If a percentile calculated is not an integer index, the index is rounded up to the next integer, so in the preceding example a $25^{th}$ percentile index would be correspond to the $3^{rd}$ element in the ordered list (e.g., Q1=48). Similarly, the $75^{th}$ percentile value would correspond to the seventh ordered element (e.g., Q3=54).

Once the percentile indexes are calculated, an upper fence value and a lower fence value are determined for use in determining outliers (block 1508). A value within a sampled data set is termed an outlier if it lies outside a determined, so-called fence. The lower fence values may be calculated by the following equations, where Q1=the $25^{th}$ percentile data value itself and Q3=the $75^{th}$ percentile data value itself (block 1508). The lower fence value is determined by Q1−1.5*(Q3−Q1) and the upper fence value may be calculated by Q3+1.5*(Q3−Q1) (block 1508). For the above example data set, the lower fence is calculated to be 48−1.5*(54−48)=39 and the upper fence value is calculated to be 54+1.5*(54−48)=63. Once the crediting contribution analyzer 314 determines the upper and lower fence values, the outliers are identified as the values above the upper fence and below the lower fence and eliminated (block 1510). Any value of the example data set that falls outside the range of 39 through 63, is determined to be an outlier (e.g., in the example data set, the values 35, 70 and 75 are outliers).

Figure 16:
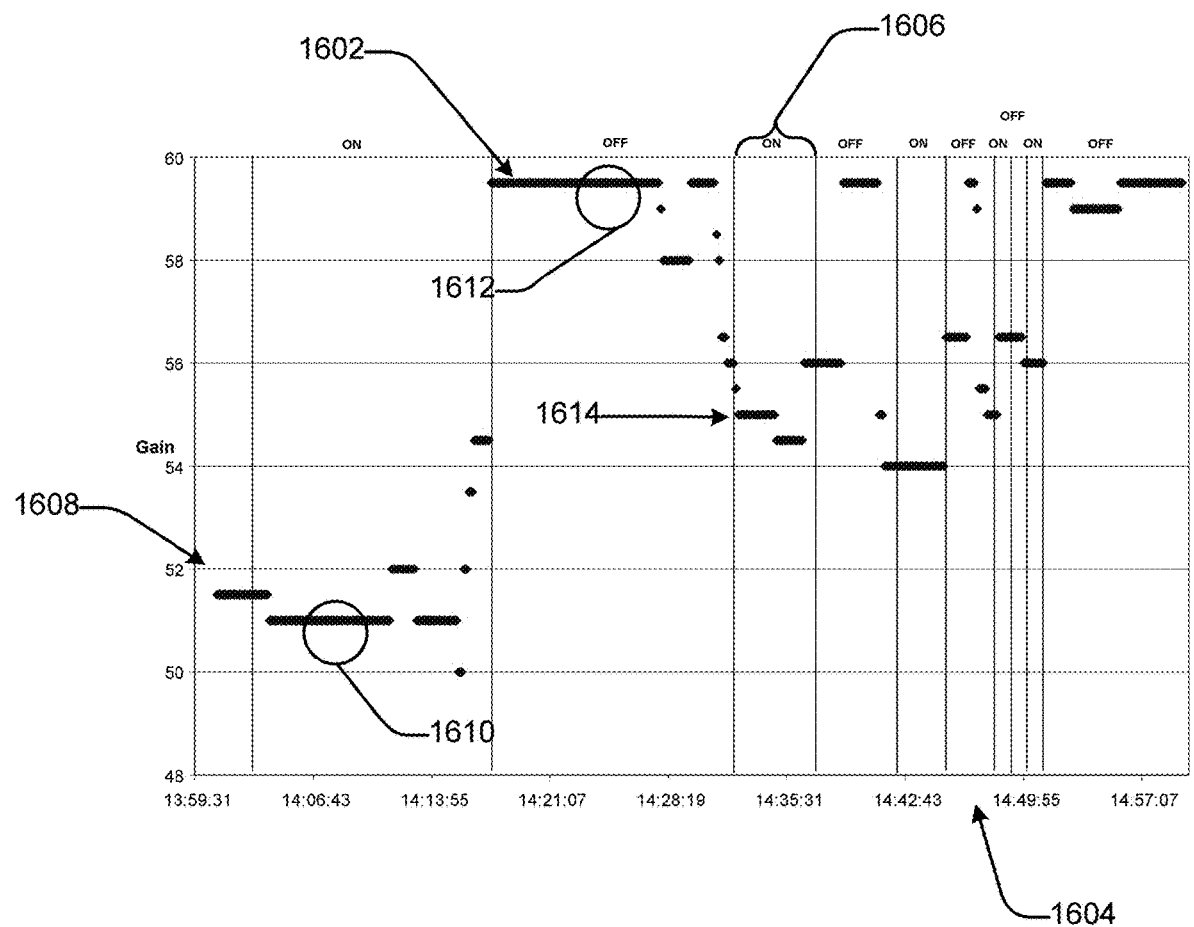
FIG. 16 is a representation of an example output generated by an example microphone gain evaluator implemented in the example on/off identifier of FIG. 3.

FIG. 16 is a graph representing example gain levels 1602 of a microphone associated with an audience measurement device 108 of FIG. 1 versus time 1604. The gain levels 1602 may be obtained from the data file 204 of FIG. 2) by the gain collector 304 and processed by the gain evaluator 402 as explained above. Periods of time, such as the example time period 1606, are further labeled to indicate the actual operating state (e.g., an on state or an off state) of a media presentation device (e.g., the STB 104 and/or the television 106) during the respective period of time 1606 measurement was performed by the audience measurement device 108.

As described above in conjunction with the gain evaluator 402, a gain threshold 1608 (e.g., 52 dB) is defined as the threshold used to determine whether the captured gain (e.g., the gain level 1610) generates a positive fuzzy contribution value (e.g., corresponding to a likely on state) or a negative fuzzy contribution value 1612 (e.g., corresponding to a likely off state). In the illustrated example, a gain level below the threshold correspondingly yields a positive fuzzy value and a gain level below the threshold yields a negative fuzzy value. However, a gain level 1614 having a value above the threshold 1608 (e.g., 55 dB>52 dB) may occur even when the monitored device is in an on state. This condition may correspond to a low volume audio output or a mute state of the media presentation device. Conversely, a gain level 1610 associated with an off state of the monitored device may have a value below the threshold 1608 as a result of persons (e.g., the household members 110) speaking within the metering area 120.

Figure 17:
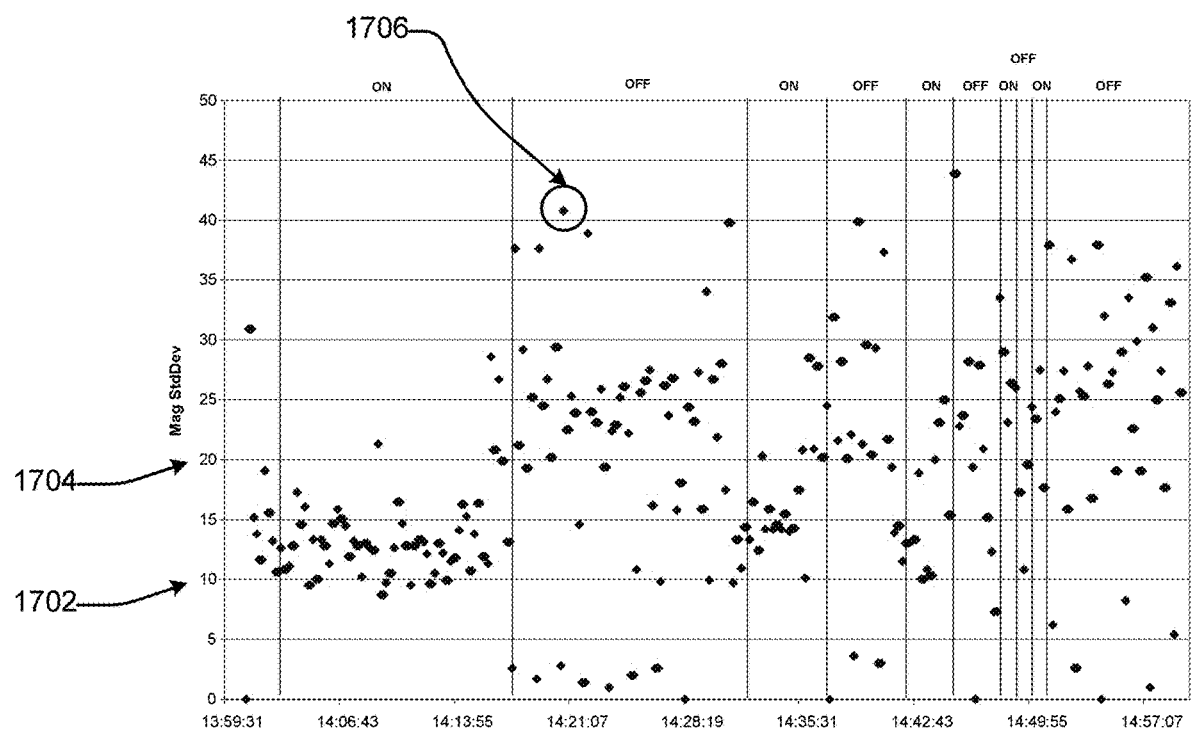
FIG. 17 is a representation of an example output generated by the example standard deviation determiner of FIG. 3 executing the example machine accessible instructions of FIG. 9.

FIG. 17 depicts example standard deviation data calculated by the magnitude standard deviation determiner 314 and graphed versus time. An examination of these experimental results reveals that standard deviations value between zero and ten (the standard deviation value 1702) are associated with a television off condition. Further, the experimental results also revealed that an on state correlated with a standard deviation value within the range of standard deviation values 1704 between 10 and 20. Also, a very high standard deviation, for example the standard deviation value 1706, also was associated with an off condition and may, thus, also be included in the calculation of a fuzzy contribution value within a the standard deviation evaluator 406 of FIG. 4A.

Figure 18:
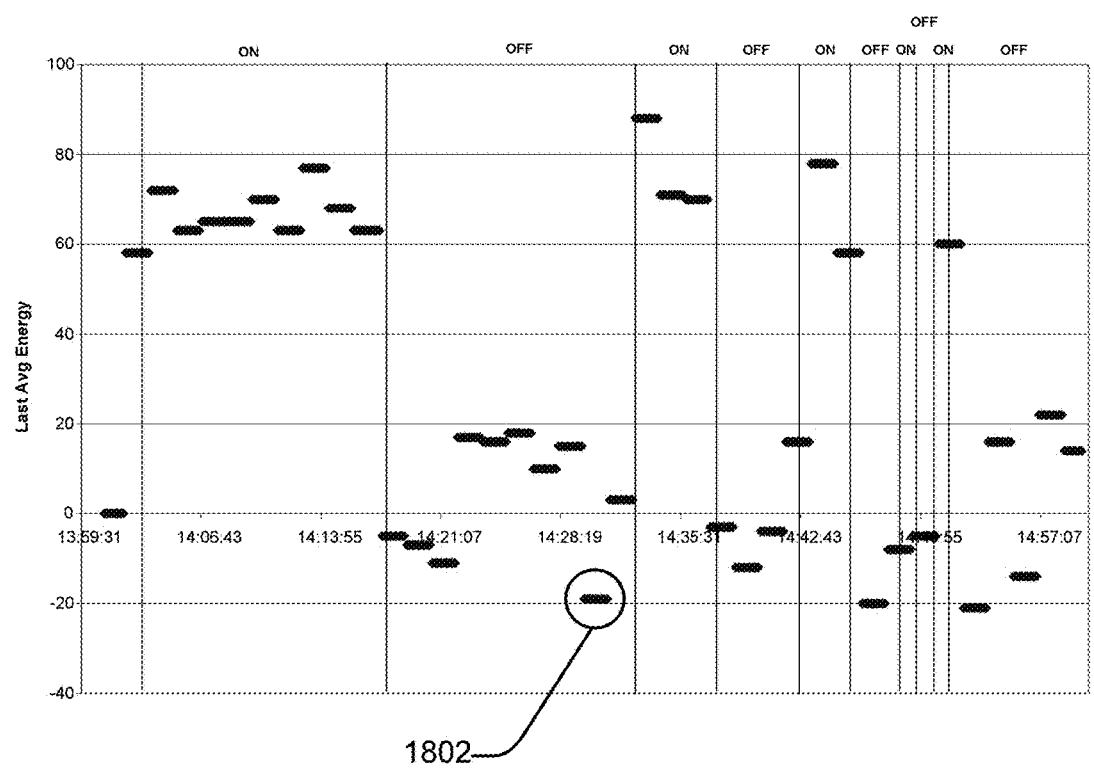
FIG. 18 is a representation of an example output generated by the example integrated magnitude determiner of FIG. 3 executing the example machine accessible instructions of FIG. 10.

FIG. 18 is a graph depicting example magnitude values that may be generated by the integrated magnitude determiner 312. The sample outputs correspond to the integrated magnitude of a signature associated with an audio signal captured by a microphone of the audience measurement device 108. As discussed above in conjunction with the integrated magnitude determiner 312 of FIG. 3 and with FIG. 7, the integrated magnitude value only generates a fuzzy contribution value when the integrated magnitude value is determined to be negative (e.g., the data point 1802) because values above zero may be associated with either an on state or an off state. A negative magnitude value may be due to, for example, a change in gain of the audio signal used to create the signature or a change in, or occurring during, a normalization process for the signature.

Figure 19A:
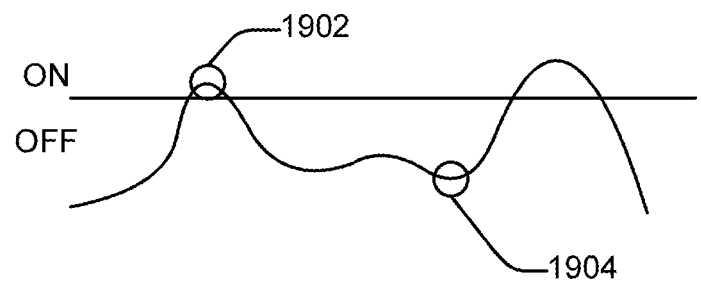
FIGS. 19 A-19C are representations of example outputs generated by the example fuzzy logic engine of FIG. 3 executing the example machine accessible instructions of FIGS. 13-15.
Figure 19B:
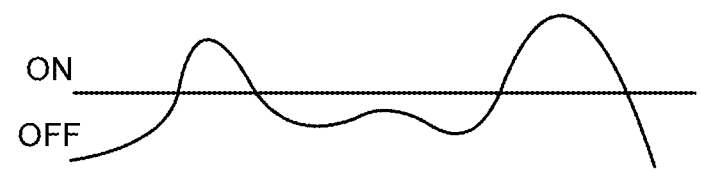
Figure 19C:
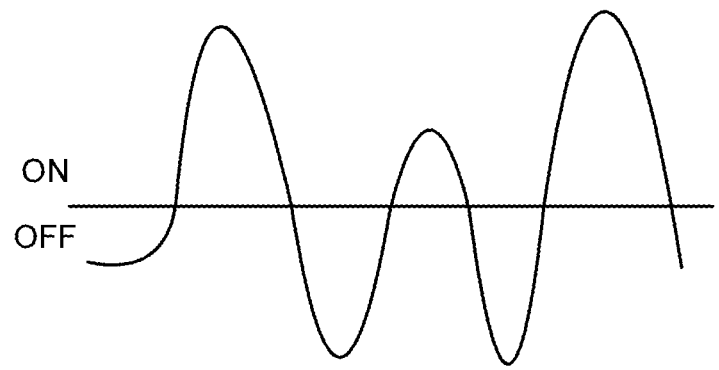

FIGS. 19A and 19B are figures representing example intermediate fuzzy score values that may be calculated by the fuzzy logic engine 316. FIG. 19C is a figure representing example final fuzzy score values that may be calculated by the fuzzy logic engine 316. For example, FIGS. 19A and B represent an example intermediate fuzzy score value that has been calculated in the fuzzy contribution analyzer 412 as discussed in conjunction with FIG. 4A and with FIG. 13. FIG. 19A also represents an intermediate fuzzy score record that may be determined prior to the normalization procedure discussed above along with FIG. 13. These experimental results indicate that a fuzzy score record may become centered on a number much less than zero. For example, an intermediate fuzzy value (e.g., the data point 1902) indicating an on state may have a value of +10, and another intermediate fuzzy value (e.g., the data point 1904) that represents an off state may have a value of −200. For consistency, the intermediate fuzzy values included in the fuzzy score record are preferably centered on zero, so that any positive value is associated with an on state and a negative value is associated with an off state.

FIG. 19B represents the example intermediate fuzzy score value of FIG. 19A after application of a normalization method to the data to center the intermediate fuzzy values resenting an on state and off state around zero (e.g., the normalization procedure described above in conjunction with FIG. 13).

Finally, FIG. 19C represents example final fuzzy score values corresponding to the intermediate fuzzy values shown in FIG. 19A and normalized as shown in FIG. 19B. Additionally, the final fuzzy scores shown in FIG. 19C reflect adjustment by signature matching contribution determined from processing in the crediting contribution analyzer 414. As shown in FIG. 19C, the crediting and/or signature match contribution makes a significant impact on the output of the fuzzy logic engine 316. As shown, the crediting and/or signature match contribution can enhance the fuzzy score to differentiate between fuzzy scores representing whether a media presentation device is in an on state or an off state.

Figure 20:
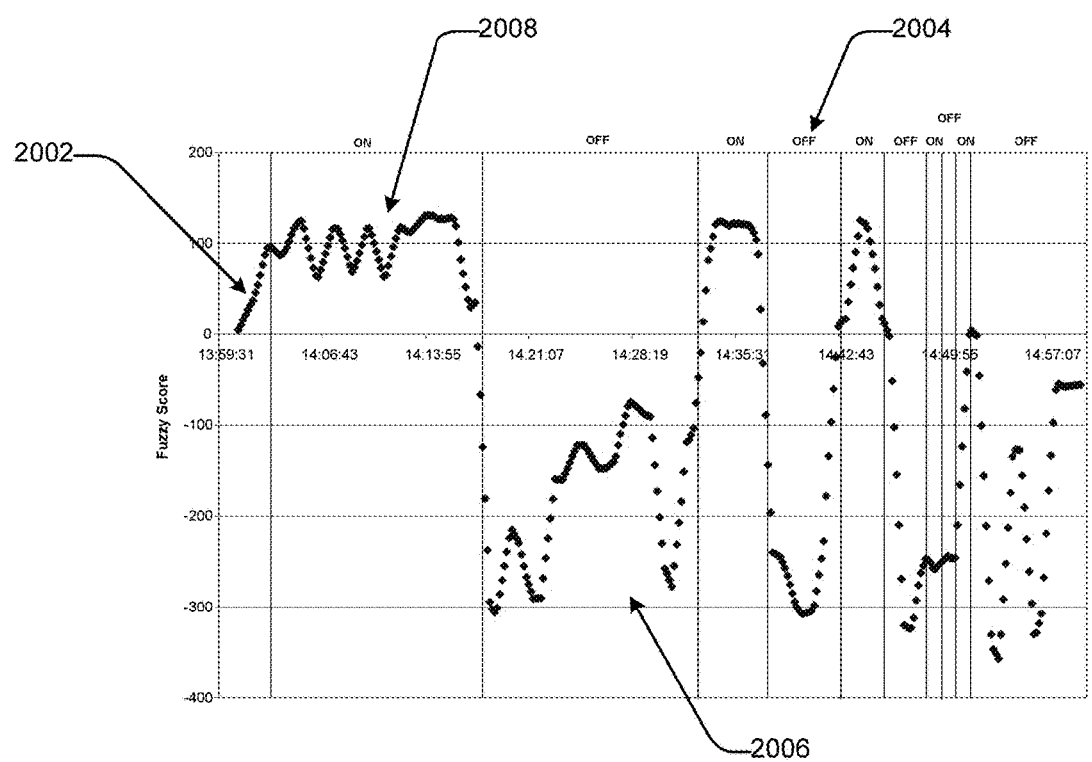
FIG. 20 is a representation of an example output generated by the example on/off identifier of FIGS. 1-2 executing the example machine accessible instructions of FIGS. 5-15.

Moving to FIG. 20, this graph represents an example final fuzzy score output from the fuzzy logic engine 316 that can be used to determine time periods where a media presentation device (e.g., the example television 106) was in an on state or in an off state and is shown by the signal 2002. The fuzzy logic engine 316 is configured to output a positive value to represent when a media presentation device is in an on state and a negative value to represent when a media presentation device is in an off state. The actual operating state of a media presentation device during a monitored time period can be compared with the example output signal 2002 by referring to the actual operating states 2004.

Further, the range between the representations of on state and off state values was extended to allow the fuzzy score to experience variations without affecting the overall score, as seen in areas 2006 and 2008. The range extension was implemented, for example, by utilizing the input convergence evaluator 410 discussed above in conjunction with FIG. 4A to determine a fifth fuzzy contribution value representative of the number of input evaluators (e.g., the gain evaluator 402, the remote control hint evaluator 404, the standard deviation evaluator 406, and the integrated magnitude evaluator 408) that indicated an on state (i.e. had a positive fuzzy contribution score). Additionally, the range was extended by utilizing an adjustment value implemented as a step input based on a signature matching contribution factor (e.g., the adjustment of the crediting contribution analyzer 414).

Figure 21:
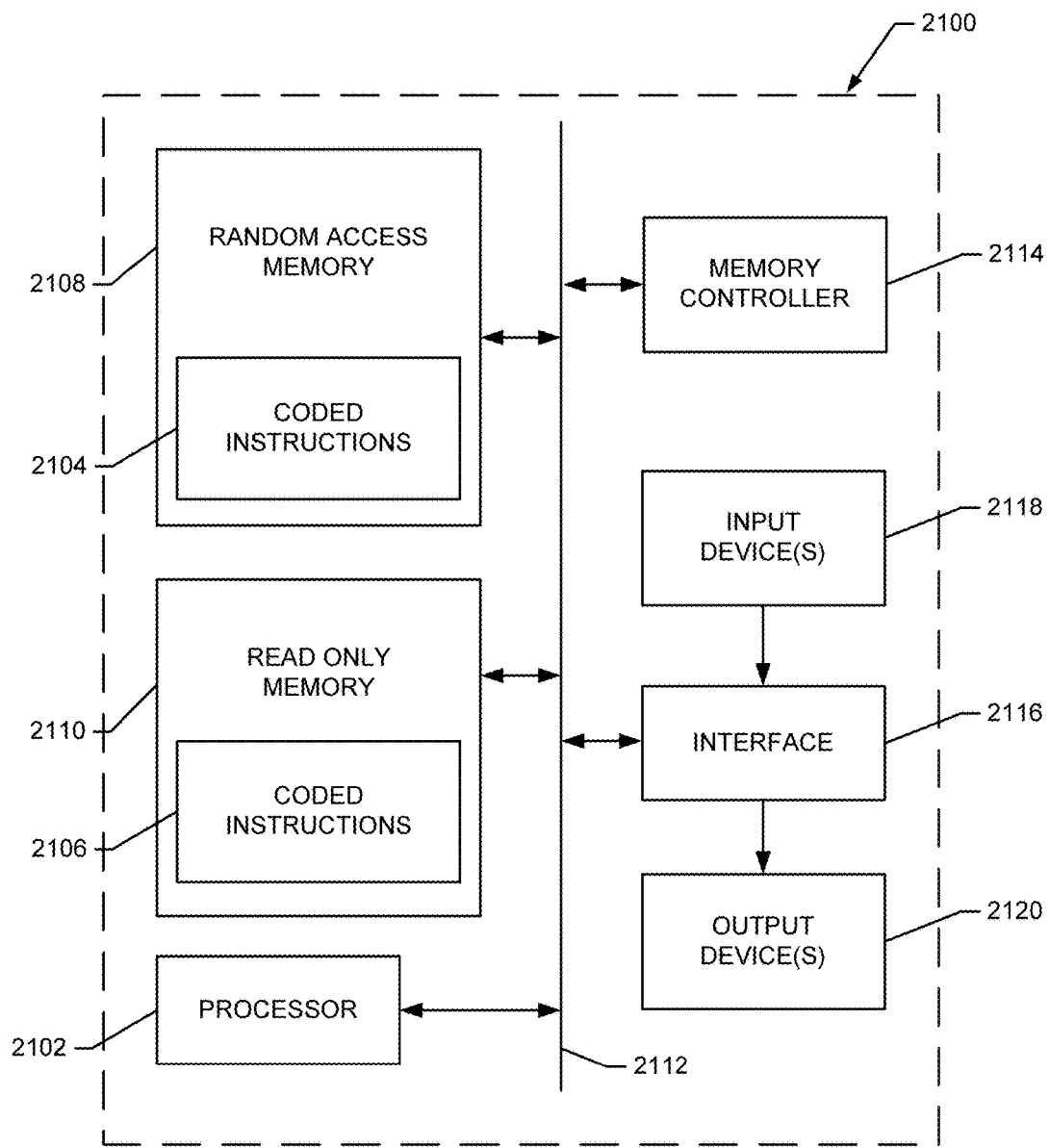
FIG. 21 is a block diagram of an example processor system that may be used to execute the example machine accessible instructions of FIGS. 5-15 to implement the example system and/or apparatus of FIGS. 1-4A.

FIG. 21 is a schematic diagram of an example processor platform 2100 that may be used and/or programmed to execute any or all of the example machine readable instructions of FIGS. 5-15 to implement the on/off identifier 116, the remote control hint collector 302, the microphone gain collector 304, the data collector 306, the signature collector 308, the signature characteristic determiner 310, the integrated magnitude determiner 312, the magnitude standard deviation determiner 314, the fuzzy logic engine 316, the output database 318, the gain evaluator 402, the remote control hint evaluator 404, the standard deviation evaluator 406, the integrated magnitude evaluator 408, the input convergence evaluator 410, the fuzzy contribution analyzer 412, crediting contribution analyzer 414, and/or the creditor 418 of FIGS. 1-4A. For example, the processor platform 2100 can be implemented by one or more general-purpose processors, microcontrollers, etc. The processor platform 2100 of the example of FIG. 21 includes at least one general-purpose programmable processor 2102. The processor 2102 executes coded instructions 2104 and/or 2106 present in main memory of the processor 2102 (e.g., within a RAM 2108 and/or a ROM 2110). The processor 2102 may be any type of processing unit, such as a processor or a microcontroller. The processor 2102 may execute, among other things, the example methods and apparatus described herein.

The processor 2102 is in communication with the main memory (including a RAM 2108 and/or a ROM 2110) via a bus 2112. The RAM 2108 may be implemented by dynamic random-access memory (DRAM), synchronous dynamic random-access memory (SDRAM), and/or any other type of RAM device, and the ROM 2110 may be implemented by flash memory and/or any other desired type of memory device. A memory controller 2114 may control access to the memory 2108 and the memory 2110. In an example implementation, the main memory (e.g., RAM 2108 and/or ROM 2110) may implement the example database 204 of FIG. 2.

The processor platform 2102 also includes an interface circuit 2116. The interface circuit 2116 may be implemented by any type of interface standard, such as an external memory interface, serial port, general purpose input/output, etc. One or more input devices 2118 and one or more output devices 2120 are connected to the interface circuit 2116.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to determine a state of a presentation device, comprising:
   determining contribution values from at least one of a signal measured from a sensing device or an output signal accessed from the presentation device, wherein the contribution values are indicative of a state of a presentation device;
   summing, via a logic circuit, a first plurality of the contribution values corresponding to a first measurement cycle to generate a first intermediate fuzzy score for the first measurement cycle;
   storing the first intermediate fuzzy score in a buffer including a plurality of intermediate fuzzy scores corresponding to respective measurement cycles;
   combining, via the logic circuit, the intermediate fuzzy scores corresponding to a first time period to form a final fuzzy score;
   when the final fuzzy score satisfies a first threshold, setting the state of the presentation device as on and enabling crediting of media presented by the presentation device.

2. The method as defined in claim 1, wherein the combining of the intermediate fuzzy scores includes averaging the intermediate fuzzy scores corresponding to the first time period.

3. The method as defined in claim 1, further including removing outliers from the buffer before combining the intermediate fuzzy scores to form the final fuzzy score.

4. The method as defined in claim 3, wherein the removing of the outliers includes removing ones of the intermediate fuzzy scores that fall outside a range based on one or more percentiles.

5. The method as defined in claim 1, wherein the final fuzzy score is one of a set of final fuzzy scores, and further including calculating a minimum final fuzzy score and a maximum final fuzzy score in the set of final fuzzy scores.

6. The method as defined in claim 5, further including comparing a difference between the minimum final fuzzy score and the maximum final fuzzy score to a second threshold.

7. The method as defined in claim 6, further including applying a normalization factor to respective ones of the final fuzzy scores of the set when the difference is greater than the second threshold.

8. The method as defined in claim 1, wherein the buffer is a circular buffer.

9. A tangible machine readable storage medium comprising instructions that, when executed, cause a machine to at least:
   determine contribution values from at least one of a signal measured from a sensing device or an output signal accessed from the presentation device, wherein the contribution values are indicative of a state of a presentation device;
   sum a first plurality of the contribution values corresponding to a first measurement cycle to generate a first intermediate fuzzy score for the first measurement cycle;
   store the first intermediate fuzzy score in a buffer including a plurality of intermediate fuzzy scores corresponding to respective measurement cycles;
   combine the intermediate fuzzy scores corresponding to a first time period to form a final fuzzy score; and
   when the final fuzzy score satisfies a first threshold, setting the state of the presentation device as on and enabling crediting of media presented by the presentation device.

10. The tangible machine readable medium as defined in claim 9, wherein the instructions cause the machine to combine the intermediate fuzzy scores by averaging the intermediate fuzzy scores corresponding to the first time period.

11. The tangible machine readable medium as defined in claim 9, wherein the instructions cause the machine to remove outliers from the buffer before combining the intermediate fuzzy scores to form the final fuzzy score.

12. The tangible machine readable medium as defined in claim 11, wherein the instructions cause the machine to remove the outliers by removing ones of the intermediate fuzzy scores that fall outside a range based on one or more percentiles.

13. The tangible machine readable medium as defined in claim 9, wherein the final fuzzy score is one of a set of final fuzzy scores, and the instructions cause the machine to calculate a minimum final fuzzy score and a maximum final fuzzy score in the set of final fuzzy scores and to compare a difference between the minimum final fuzzy score and the maximum final fuzzy score to a second threshold.

14. The tangible machine readable medium as defined in claim 13, wherein the instructions cause the machine to apply a normalization factor to respective ones of the final fuzzy scores of the set when the difference is greater than the second threshold.

15. The tangible machine readable medium as defined in claim 9, wherein the buffer is a circular buffer.

16. An apparatus to determine a state of a presentation device, comprising:
   an analyzer to determine contribution values from at least one of a signal measured from a sensing device or an output signal accessed from the presentation device, wherein the contribution values are indicative of a state of a presentation device;
   the analyzer to sum a first plurality of the contribution values corresponding to a first measurement cycle to generate a first intermediate fuzzy score for the first measurement cycle;
   a buffer to store the first intermediate fuzzy score, the buffer including a plurality of intermediate fuzzy scores corresponding to respective measurement cycles, the analyzer to combine the intermediate fuzzy scores for a first time period to form a final fuzzy score; and
   a creditor to set the state of the presentation device as on and enable crediting of media presented by the presentation device when the final fuzzy score satisfies a first threshold, at least one of the analyzer, the buffer or the creditor including hardware.

17. The apparatus as defined in claim 16, wherein the analyzer is to combine the intermediate fuzzy scores by averaging the intermediate fuzzy scores corresponding to the first time period.

18. The apparatus as defined in claim 16, wherein the analyzer is to remove outliers from the buffer, by removing ones of the intermediate fuzzy scores that fall outside a range based on one or more percentiles, before combining the intermediate fuzzy scores to form the final fuzzy score.

19. The apparatus as defined in claim 16, wherein the final fuzzy score is one of a set of final fuzzy scores, and the analyzer is to calculate a minimum final fuzzy score and a maximum final fuzzy score of the set of final fuzzy scores and compare a difference between the minimum final fuzzy score and the maximum final fuzzy score to a second threshold.

20. The apparatus as defined in claim 19, wherein the analyzer is to apply a normalization factor to respective ones of the final fuzzy scores of the set when the difference is greater than the second threshold.

* * * * *